(12) United States Patent
Immidi

(10) Patent No.: US 10,778,612 B2
(45) Date of Patent: Sep. 15, 2020

(54) VARIABLE TCAM ACTIONS

(71) Applicant: Arista Networks, Inc., Santa Clara, CA (US)

(72) Inventor: Kiran Kumar Immidi, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/165,291

(22) Filed: May 26, 2016

(65) Prior Publication Data

US 2017/0346765 A1    Nov. 30, 2017

(51) Int. Cl.
*H04L 12/931* (2013.01)
*H04L 12/743* (2013.01)
*H04L 12/725* (2013.01)

(52) U.S. Cl.
CPC .......... *H04L 49/354* (2013.01); *H04L 45/302* (2013.01); *H04L 45/7457* (2013.01)

(58) Field of Classification Search
CPC .... H04L 49/354; H04L 45/72; H04L 45/7457
USPC .................................................... 370/395.53
See application file for complete search history.

(56) References Cited

U.S. PATENT DOCUMENTS

| | | | | |
|---|---|---|---|---|
| 10,318,587 | B1* | 6/2019 | Bosshart | G11C 11/40615 |
| 2014/0122791 | A1* | 5/2014 | Fingerhut | H04L 49/00 |
| | | | | 711/108 |
| 2014/0241362 | A1* | 8/2014 | Bosshart | H04L 69/22 |
| | | | | 370/392 |
| 2014/0310307 | A1* | 10/2014 | Levy | H04L 45/7453 |
| | | | | 707/769 |
| 2015/0039823 | A1* | 2/2015 | Chen | G06F 17/30982 |
| | | | | 711/108 |
| 2015/0058595 | A1* | 2/2015 | Gura | G06F 12/1018 |
| | | | | 711/206 |
| 2015/0326480 | A1* | 11/2015 | Dolganow | H04L 47/125 |
| | | | | 711/108 |
| 2017/0052731 | A1* | 2/2017 | Levy | G06F 3/0638 |
| 2017/0195253 | A1* | 7/2017 | Annaluru | H04L 41/0816 |
| 2017/0222906 | A1* | 8/2017 | Johnsen | H04L 47/20 |
| 2018/0107759 | A1* | 4/2018 | Cheng | G06F 16/9014 |
| 2019/0273694 | A1* | 9/2019 | Thirumurthi | H04L 47/726 |

* cited by examiner

*Primary Examiner* — Christopher R Crompton
(74) *Attorney, Agent, or Firm* — Haley Guiliano LLP

(57) ABSTRACT

Described herein are various embodiments of a network element comprising a network port to receive a unit of network data and a data plane coupled to the network port. In one embodiment the data plane includes a ternary content addressable memory (TCAM) module to compare a first set of bits in the unit of network data with a second set of bits in a key associated with a TCAM rule. The second set of bits includes a first subset of bits and a second subset of bits and the TCAM module includes first logic to compare one or more bits in the first set of bits against the second set of bits, and second logic to select an action or a result using bits from either the second subset of bits, from the unit of network data, or from meta data associated with the unit of network data. Other embodiments are also described.

24 Claims, 17 Drawing Sheets

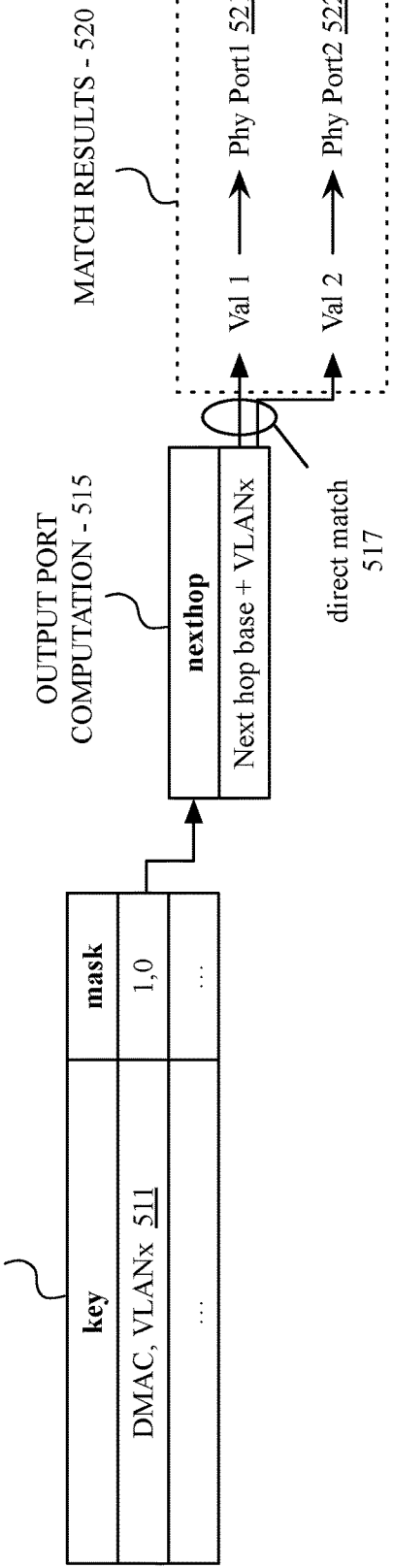
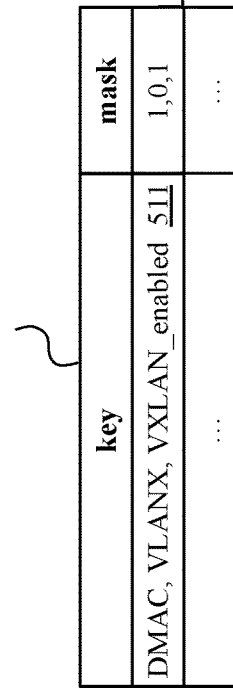
FIG. 5A
FIG. 5B

VARIABLE TCAM ACTIONS

FIELD OF INVENTION

This invention relates generally to data networking and more particularly to content addressable memory logic for use in network forwarding elements.

BACKGROUND OF THE INVENTION

Content addressable memory (CAM), including ternary content addressable memory (TCAM), can be used in network forwarding elements (e.g., network elements) to perform high data rate search operations. CAMs and TCAMs are hardware search engines including memory that hold rules to be searched. CAMs have two states whereby the value in a bit in a rule has to be 0 or 1. TCAMs have three states: 0, 1 and X (or Don't Care).

The speed offered by a TCAM solution may be essential for some implementations. For example, network elements can use TCAMs to implement policy based routing, in which polices are defined that apply to some units of network data but do not apply to other units of network data. TCAMs can be used to implement access control lists within the network elements that are applied to units of network data upon entry (ingress) and/or exit (egress) from the network element. Additionally, a sufficiently large TCAM can be used to make forwarding decisions for network data by defining at least a portion of the forwarding data (e.g., routing table) as a set of TCAM rules.

However, for a given set of rules that define a policy or forwarding database, a TCAM-based solution compared to a memory-based solution is both more expensive and higher in power consumption. These drawbacks can limit the memory size of a TCAM solution, which can limit the number of rules that may be defined.

SUMMARY OF THE DESCRIPTION

Described herein are various embodiments of a network element including a TCAM supporting variable actions. The variable actions enable multiple TCAM rules to be condensed into a single rule that selects a result and/or action based on a variable portion of input data.

One embodiment provides for a network element comprising a network port to receive a unit of network data and a data plane coupled to the network port. In such embodiment the data plane including a ternary content addressable memory (TCAM) module to compare a first set of bits in the unit of network data with a second set of bits in a key associated with a TCAM rule. The second set of bits includes a first subset of bits and a second subset of bits and the TCAM module includes first logic to compare the first subset of bits against one or more bits in the first set of bits and second logic to select a result using the second subset of bits after the first logic determines a match to the first subset of bits.

One embodiment provides for a network processing system comprising a forwarding module to forward a unit of network data; and a ternary content addressable memory (TCAM) module coupled to the forwarding module, the TCAM module to select a set of forwarding actions for the forwarding module based a match between a first set of bits in the unit of network data and a second set of bits in a TCAM match key and to select a forwarding action from the set of forwarding actions based on a third set of bits, the third set of bits to be identified by a fourth set of bits.

One embodiment provides for a data processing method in an integrated circuit, the method comprising receiving input data including selected fields of network data or metadata and comparing the input data to a match key portion of a rule key associated with a rule within the integrated circuit, the integrated circuit including a ternary content addressable memory (TCAM). In such embodiment the rule key includes the match key portion and a variable portion, the variable portion to specify one or more bits of the input data that contain variable data. In a further embodiment the method additionally comprises selecting a set of results within memory associated with the TCAM in response to a ternary comparison match between at least the match key portion and the input data; selecting a result from the set of results using the one or more bits of the input data specified as containing variable data; and providing the result selected from the set of results to logic within a network element.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

FIGS. 5A-B illustrate a variable forwarding system configured to use using TCAM variable, according to multiple embodiments.

DETAILED DESCRIPTION

Figure 1:
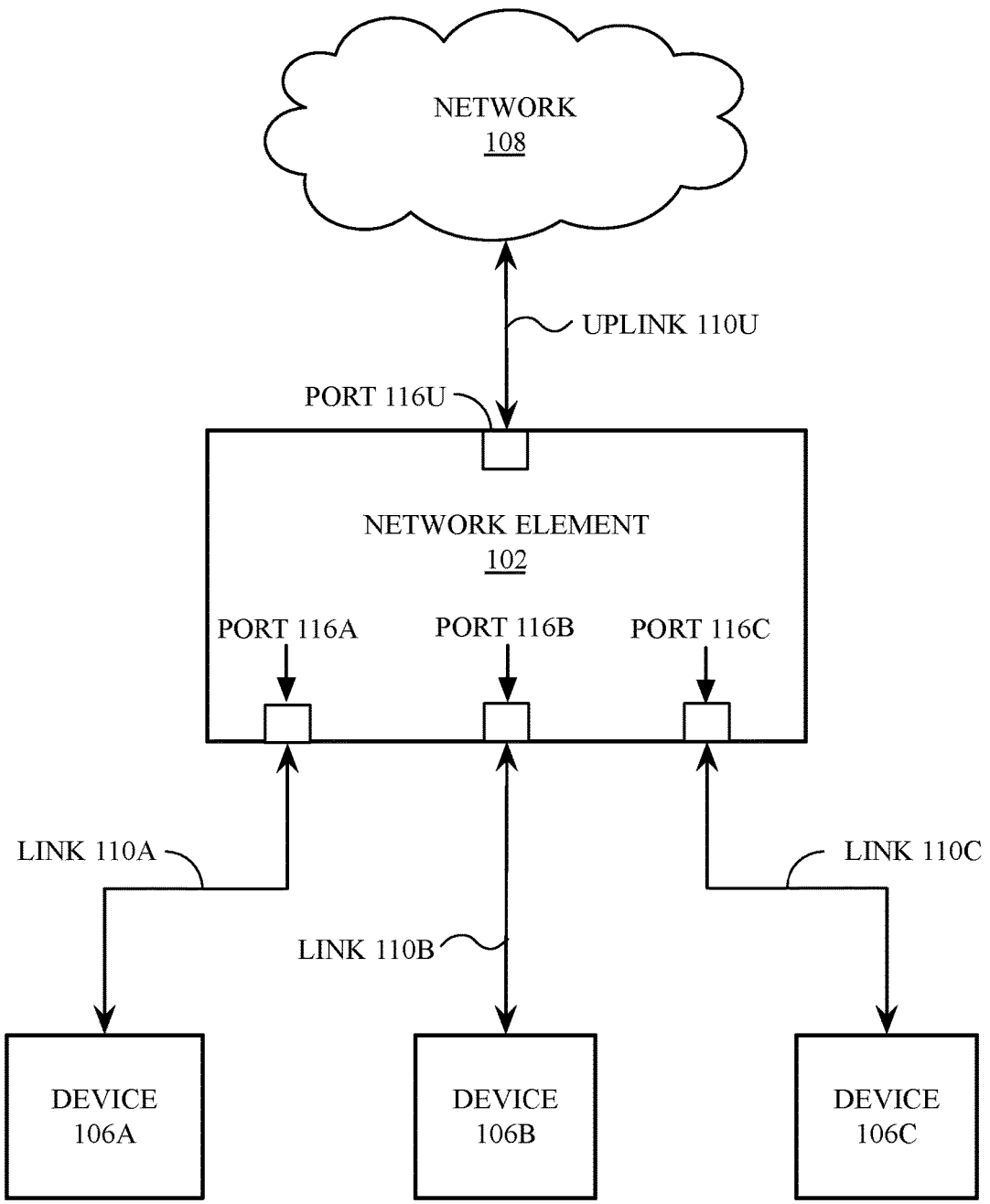
FIG. 1 is a block diagram of one embodiment of a system that includes a network element communicating network data between a network and a number of devices.

Embodiments described herein provide for a network element having a TCAM implementation that provides explicit support for variable based actions. A TCAM rule can be defined in which upon matching fields defined for a match key, the precise action to be performed is based on a variable derived from input data. In one embodiment, when a TCAM rule having a variable action is defined, the rule can define the specific field that is used as variable data. In one embodiment, the variable action can specify an action which will be performed differently based on the variable data. For example and in one embodiment, an action can be configured such that, upon a TCAM key match, incoming data may be forwarded to one of several ports based on a specified variable. In one embodiment, one of several actions is selected and performed based on the specified variable data. For example and in one embodiment, an incoming unit of network data may discarded as invalid, dropped, forwarded to one or more output ports, or transferred to a control plane processor based on the specified variable data.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In many network element implementations, TCAMs are used to make at least some forwarding decisions for incoming network data, including determining whether to forward or drop a unit of network data, determining an output port for the network data, determining whether to egress or drop a unit of network data, and determining whether to modify a field of a unit of network data. The operation or set of operations to be performed on a unit of network data can be referred to as an action. A network element can make use of a matching TCAM in which a variety of predefined actions are selected by performing a matching operation on selected header fields of network data. Selected data values for selected network header fields can be used as a key for a rule. A mask can be defined that is applied to header field data that is read from the unit of network data. The TCAM logic then performs a parallel compare operation in which the masked input data is compared to the keys defined for each rule. While rules are generally defined to match against header fields in a unit of input data, in one embodiment any arbitrary data offset within a unit of network data can be matched by a rule.

For a given unit of network data, one or more of the predefined actions can be selected based on the key and mask matching operation. In some instances, the action to be performed can accept an additional argument that is used when performing the action. The argument can be a value that is selected when programming the rule associated with an action and can be selected from one or more of the fields used in the matching operation that is performed to select the action.

However, when an action selected by the TCAM is to be based on a variable argument, existing implementations utilize separate rules for each possible value of an argument. For example, in the case of forwarding data for a virtual local area network (VLAN) forwarding or a virtual extensible local area network (VXLAN), multiple rules can be defined for each VLAN. In an additional example of quality of service (QoS) based forwarding, multiple rules can be defined for each QoS classification. The large number of rules that may be required using this method may limit the ability to use a TCAM for matching operations. Instead, matching operations may be required to use non-TCAM based memory, which may result in increase forwarding latency in comparison to a TCAM based approach.

The explicit support for variable actions provided by embodiments described herein enable multiple TCAM rules to be collapsed into a single rule. A TCAM rule can be defined in which the matching action has a variable field, where the variable field is used to define the specific action that is selected based on the match or is used to modify how a single action is performed. In one embodiment the variable field can be used to compute a direct match in which the result is determined by adding a value associated with the variable to a base value in action memory. The rules that match against each result can then be condensed to a single rule having a variable field.

In one embodiment an action can be programmed that automatically performs a single action based on variable data at a location specified within the action. For example, the variable field in the TCAM rule can be excluded and instead the variable can be programmed within the action. The variable programmed within the action can be performed based on data at an offset within a unit of network data upon which the action is to be performed. For example, an action can be configured which will forward an incoming unit of network data to an output port, where the specific output port to which the network data is to be forwarded is automatically determined based on a specified field or offset within the network data. In one embodiment, instead of an offset within the unit of network data, a specific element of metadata can be specified by the action. For example, the metadata for a unit of network data can specify information such as the incoming physical port for the unit of network data. An action can be configured which will forward an incoming unit of network data to an output port, where the specific output port to which the network data is to be forwarded is automatically determined based on the incoming physical port for the unit of network data specified in the metadata associated with the unit of network data.

In one embodiment the variable field within a TCAM rule can be used to compute an indirect match to an action. In one embodiment a single rule can match against a single action and the performance of the single action can be modified based on data at a specified offset within an offset table. Processing logic within or associated with the TCAM can be configured to reference the lookup table in random access memory (RAM).

The RAM lookup table can contain data values for use with the action matching the defined rule. In one embodiment an indirect match can be used to specify a meta-action that will perform one of several actions selected from the lookup table in RAM. The meta-action can be configured to specify an offset or field within a unit of network data being processed or metadata associated with the unit of network data being processed. The offset, field within the unit of network data or the metadata associated within the unit of network data can specify a value that is, or can be translated to, an offset value into an offset table. The meta-action can cause a processing element to read the specified data perform determine an offset, then perform an action listed at the offset within an offset table including multiple actions.

In one embodiment, the offset table can be a hash table, or any other space efficient lookup structure that provides sufficiently fast lookup time semantics. The hash table or other space efficient lookup structure can be used when a large number of entries into an offset table would otherwise be identical. In such implementation, only the unique entries can be specified in the lookup table and a hash of the index or offset into the table can be mapped to those entries. The other entries may be omitted and replaced with a default value that is performed in the event a match is not found during the lookup.

The various embodiments of variable TCAM actions as described herein can be implemented in the network system and network elements described below.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
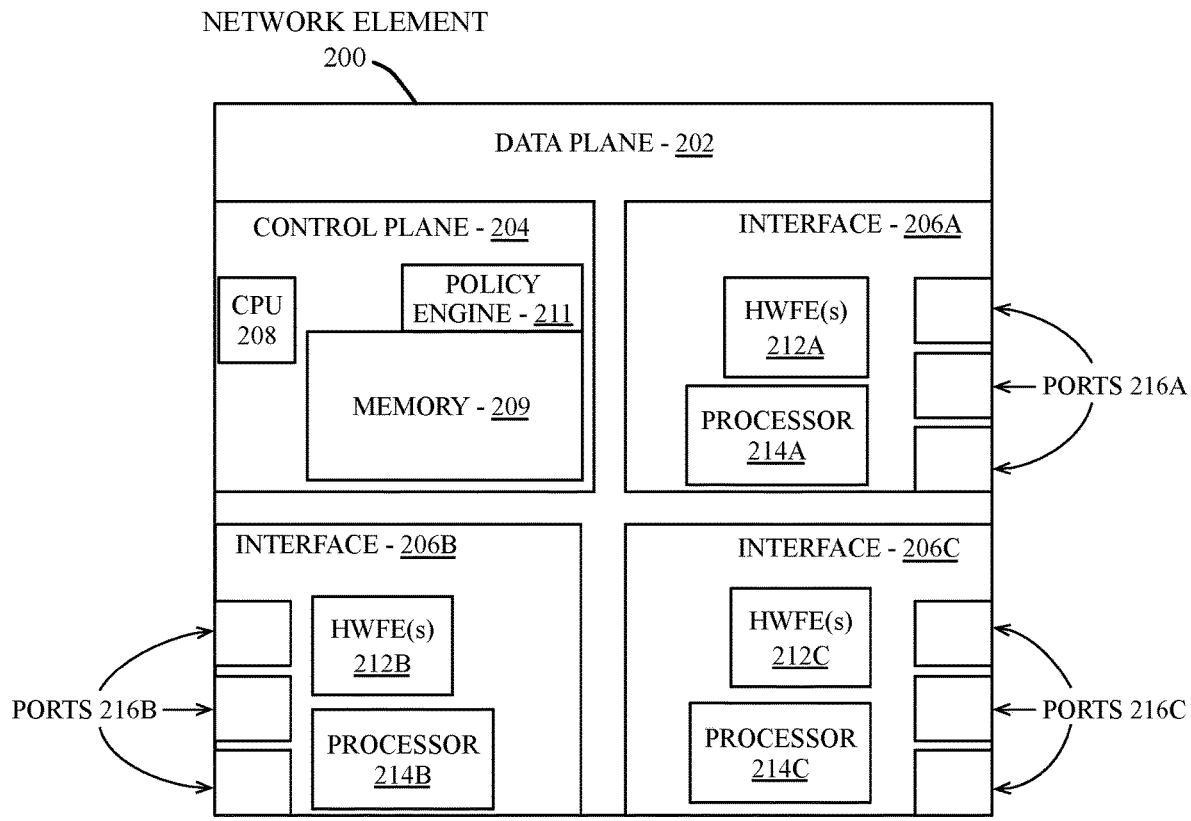
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C includes multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, performing routing, switching, or other types of network forwarding. Each processor 214A-C can be used to accelerate various functions of the interface devices 206A-C.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C.

In one embodiment, the memory 209 that is used to store data for the control plane 204 is shared with the data plane 202. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
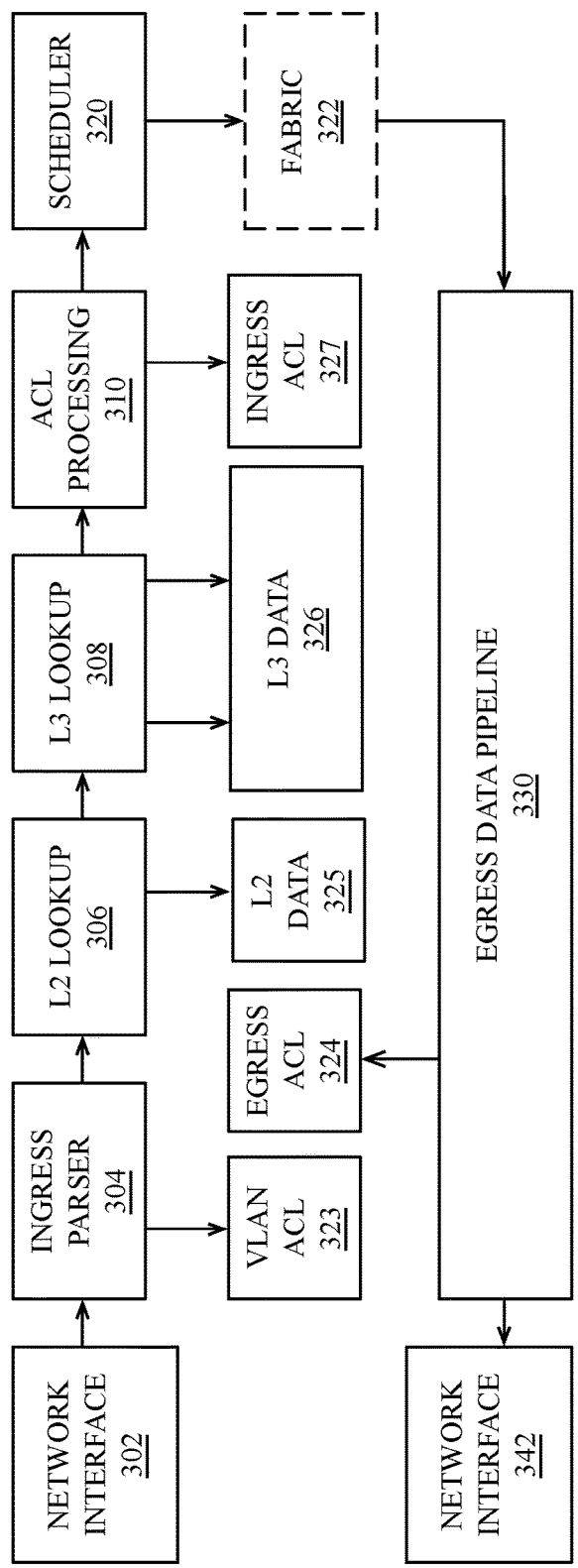
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 312), which includes logic from one or more of the HWFE(s) 212 within each interface 206 shown in FIG. 2. While FIG. 3 focuses primarily on the ingress aspects of the forwarding pipeline 300, the relevant logic of the various embodiments may be used in the ingress or egress portions of the forwarding pipeline. As illustrated, the forwarding pipeline 300 includes an ingress network interface 302, an ingress parser 304, a data-link layer lookup (e.g., L2 lookup 306), a network layer lookup (e.g., L3 lookup 308), an access control list (ACL) processing block 310, and a scheduler 320. In one embodiment, one or more of the ACL and/or forwarding operations of the forwarding pipeline are performed using the TCAM variable actions described herein.

Access control lists in the form of a VLAN ACL 323, Ingress ACL 327, and Egress ACL 324 allow policy and filtering actions to be performed on network data at multiple stages within the forwarding pipeline 300. L2 data 325 and L3 data 326 store various tables used to perform data-link layer (layer 2) and network layer (layer 3) forwarding by the forwarding pipeline 300. In one embodiment, after processing and forwarding operations are performed by ingress elements of the forwarding pipeline, the scheduler 320 forwards ingress network data to a fabric 322 module, which provides data-plane connectivity between multiple packet processors in the network element. In one embodiment a single chip solution is used for the ingress and egress pipelines of the forwarding pipeline 300, omitting the fabric module 322. Either through the fabric module 322 or via a scheduling engine, the scheduler 320 can forward the ingress network data to the egress data pipeline 330 for egress processing once the set of forwarding decisions have been made. The egress data, after processing by the egress data pipeline 330, is re-transmitted via an egress network interface 342.

In one embodiment, forwarding operations for a unit of network data proceed as follows. First, the network data is received by an ingress network interface 302. For embodiments including Ethernet interfaces, the network interface 302 includes a physical layer (PHY) and a media access control (MAC) layer. The PHY layer is responsible for transmission and reception of bit streams across physical connections including encoding, multiplexing, synchronization, clock recovery and serialization of the data on the wire for whatever speed/type of Ethernet interface is configured. Operation of the PHY complies with the IEEE 802.3 standard. The PHY layer transmits/receives the electrical signal to/from the transceiver where the signal is converted to light in the case of an optical port/transceiver. In the case of a copper (electrical) interface, e.g., Direct Attach Cable (DAC), the signals are converted into differential pairs.

If a valid bit stream is received at the PHY, the data is sent to the MAC layer. On input, the MAC layer is responsible for turning the bit stream into frames, packets, or another division of network data based on the supported and implemented protocols and standards of the network element. This operation can include performing error checking and finding the start and end delimiters for the unit of network data. In one embodiment, while the entire unit of network data is received at the MAC/PHY layer only header data is sent through to the remainder of the forwarding pipeline 300.

In one embodiment, headers for the unit of network data are parsed at an ingress parser 304, which extracts key fields used to make forwarding decisions. For a typical unit of Internet Protocol version 4 (IPv4) network data, the ingress parser 304 can extract a variety of layer 2, layer 3, and layer 4 headers, including source and destination MAC addresses, source and destination IP addresses, and source and destination port numbers. In one embodiment, the ingress parser 304 also determines the VLAN ID of the unit of network data. Where the unit of network data has arrived via a trunk port, the VLAN ID can be determined based on a VLAN header. When the unit of network data arrives via an access port or arrived untagged, the VLAN ID may be determined based on the port configuration.

In one embodiment, once the ingress parser 304 is aware of the VLAN ID and ingress interface the ingress parser 304 verifies the spanning tree protocol (STP) port state for the receiving VLAN. In one embodiment, the network element supports the rapid spanning tree protocol (RSTP). If the port STP/RSTP state indicates that the unit of network data should be forwarded (e.g., blocking, listening, discarding, learning, etc.) the unit of network data is dropped. If the STP/RSTP state is learning, the MAC address table is populated with information from the unit of network data and the unit of network data is dropped. If the port STP state is forwarding, then the headers for the unit of network data are allowed to proceed down the pipeline.

In one embodiment, the ingress parser 304 can perform a further comparison for the unit of network data against any configured Port ACLs by performing a lookup in the VLAN ACL 323. If the unit of network matches a DENY statement the unit will be dropped. If the unit of network data matches a PERMIT statement, or no port ACL is applied, then the unit of network data is passed to the next block of the pipeline. Successive stages include L2 lookup 306 and an L3 lookup 308 stages. The L2 lookup 306 stage will reference L2 data 325, which may be a MAC address table, which is an exact-match table. The L3 lookup 308 will reference L3 data 326, which includes an exact-match table that contains/32 IPv4 and/128 IPv6 host routes, and a longest-prefix match (LPM) table that contains IPv4 and IPv6 routes that are not host routes.

TCAM Rules for Network Data Forwarding

When an action selected by the TCAM is to be based on a variable argument, existing network element implementation utilize separate rules for each possible value of an argument. For example, in the case of virtual local area network (VLAN) forwarding, multiple rules can be defined for each VLAN.

Figure 4:
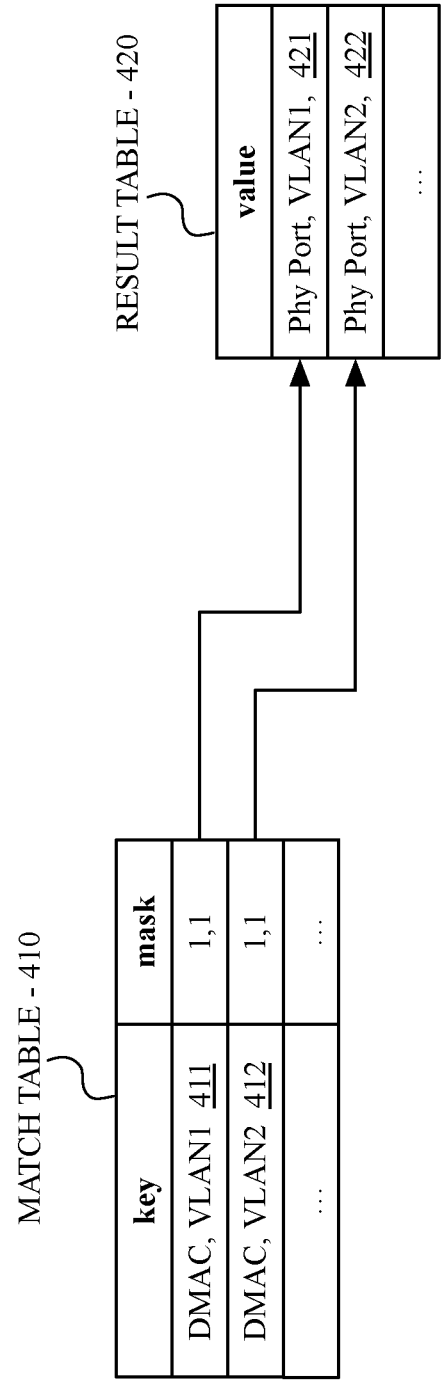
FIG. 4 shows an example of TCAM rules forwarding VLAN network data.

FIG. 4 shows an example of TCAM rules 400 forwarding VLAN network data. A match table 410 is shown containing a first key 411 and a second key 412. The first key 411 includes a destination media access control (DMAC) address and a VLAN identifier for a first VLAN. The second key 412 includes a DMAC address and a VLAN identifier for a second VLAN. A mask (e.g., 1,1) is shown for each key, where the (1,1) symbolizes a mask that selects for all bits in the DMAC and VLAN fields. Based on the DMAC address and VLAN defined in the match table 410, incoming data may be forwarded based on a value in a result table 420, either a first result 421 indicating a physical port associated with the first VLAN, or a second result 422 indicating a physical port associated with the second VLAN.

In one embodiment, VXLAN is supported, such that a virtual tunnel endpoint (VTEP) can encapsulate and de-encapsulate network data within a VXLAN header. In such embodiment, multiple VLANs may be associated with a single physical port. In such instance, the match table 410 may be configured such that the DMAC in each key matches to the same destination (e.g., a layer 3 network element) and each result matches to the same physical port (e.g., the next hop associated with the layer 3 network element). In such instance, the only variable in the rules is the associated VLAN, as the network element performs an action to tag the network data on egress with the appropriate VLAN.

In embodiments described herein, the multiple rules within the match table 410 can be condensed into a single rule having a variable action based on the matching VLAN. For each DMAC and associated physical port, a variable rule can be defined as show in Table 1 below.

TABLE 1

TCAM rule having a variable action

| Key Qualifiers | Mask | Value/Action |
|---|---|---|
| DMAC, L2 Domain ID | 1, 0 | Next Hop + L2 Domain |

The exemplary rule of Table 1 indicates that, for all incoming network data having a DMAC address matching the indicated DMAC, perform the action defined at some specified base action address and the specific L2 domain identifier (e.g., VLAN, VFI, etc.) indicated by the incoming data. The specification of both the DMAC field and the L2 domain identifier field in the rule indicates that the TCAM logic is to read the DMAC and VLAN fields from the incoming network data. The mask field (1,0) indicates that, while the key specifies that while the destination MAC address field and the L2 domain identifier field will be read from the header data of the incoming network data, the match is to be performed using only the DMAC data, without regard to the data in the L2 domain identifier field.

The specific action to be performed for any network data having a matching DMAC is determined based on the value of the L2 domain identifier field. The specific implementation of this variable action varies between embodiments. In one embodiment the action can be determined using a direct matching method, in which an action is performed based on an action in TCAM action memory located at some base value plus an offset defined by the value of the L2 domain identifier field. In one embodiment, the action can be determined using an indirect matching method, in which a single action in TCAM action memory causes processing logic to reference an offset table in RAM, where the offset table includes data values and/or actions to perform based on a match in the TCAM for the variable rule. In one embodiment, both direct and indirect matching may be enabled and can be selected on a per TCAM or per-rule basis.

While in some figures and examples a VLAN identifier is illustrated as the L2 domain identifier, for example as illustrated and described with respect to FIG. 4 and in the Figures below, VLAN (or VXLAN) is simply one example of a layer 2 domain identifier that can be specified for use in the variable rules. In the embodiments described herein, any layer 2 domain identifier, such as a virtual forwarding instance (VFI), or any other layer 2 domain identifier may be used.

FIGS. 5A-B illustrate a variable forwarding system 500 configured to use using TCAM variable, according to multiple embodiments. In one embodiment, as shown in FIG. 5A, a direct match can be used. In one embodiment, as shown in FIG. 5B, an indirect match can be used. In the example of FIG. 5A, the network element is configured to associate a single VLAN with each port. In the example of FIG. 5B, VXLAN is configured such that multiple VLANs are tagged and egressed via a single port. However, the specific embodiments are not limited to the specifically illustrated configuration.

As shown in FIG. 5A, a first variable match table 510 can include a rule 511 specifying a specific destination MAC address (e.g., DMAC) and a variable VLAN field (e.g., VLANx). The mask (1,0) can be configured such that the incoming data is masked to compare only the DMAC field, while retrieving the VLAN field from the incoming data header for use by the action. The rule can be defined such that any incoming network data having a specific DMAC will be forwarded to an output port determined at a next hop base+an offset specified by the VLAN field. TCAM logic, based on the first variable match table 510, can reference output port computation logic 515 to determine a direct match 517 to an action. For example, based on the specified VLAN from the network data, a single rule in the first variable match table 510 can select one of multiple match results 520 using the output port computation logic 515. In one embodiment, the output port computation logic 515 can be configured to direct the network element to forward the network data to a first physical port 521 or a second physical port 522.

As shown in FIG. 5B, a network element VXLAN implementation can include a rule 511 in a second variable match table 550 that specifies a destination MAC address (e.g., DMAC), indicates a variable specified by the VLAN header of the incoming data (e.g., VLANX), and indicates an additional match key field to select only VXLAN tagged data (e.g., VLAN_enabled). The mask (1,0,1) for the rule 511 can be configured such that only the DMAC and VLAN_Mask fields are to be matched for incoming data and the VLANX field is not to be matched.

In the embodiment illustrated in FIG. 5B, an indirect match 557 can be performed by table address computation logic 555, which references an offset table 558. In one embodiment the address of the offset table can be specified by the rule. In one embodiment, a single offset table can be associated with multiple rules. In one embodiment, a single offset table is associated with each TCAM. Using the specified or associated offset table, the table address computation logic 555 can determine an address from which to retrieve an indirect match 557 from the set of match results 560 based on an offset address into the offset table 558. As illustrated, the match results 560 include a first match 561 having a physical port and tag for a first VLAN and a second match 562 having a physical port and a tag for a second VLAN. The forwarding logic of the network element can then forward the network data to the indicated physical port and tag the outgoing network data with the indicated VLAN tag.

In one embodiment the offset table is stored in memory outside of the TCAM, such as in memory that is shared between the control plane and the data plane of the network element. In one embodiment, processing logic associated with the TCAM can access the shared memory to return the result referenced in the offset table. In one embodiment, the TCAM, as a result of the action, can return an address in the shared memory and separate processing logic within the data plane of the network element can retrieve data stored at the address and use the retrieved data to perform an action specified by the rule.

The uses of the variable action enabled TCAM go beyond those illustrated with respect to FIGS. 5A-B, and can be applied to any use case or operation in which existing an existing TCAM may be used. An additional use is shown in FIGS. 6A-6B.

Figure 6A:
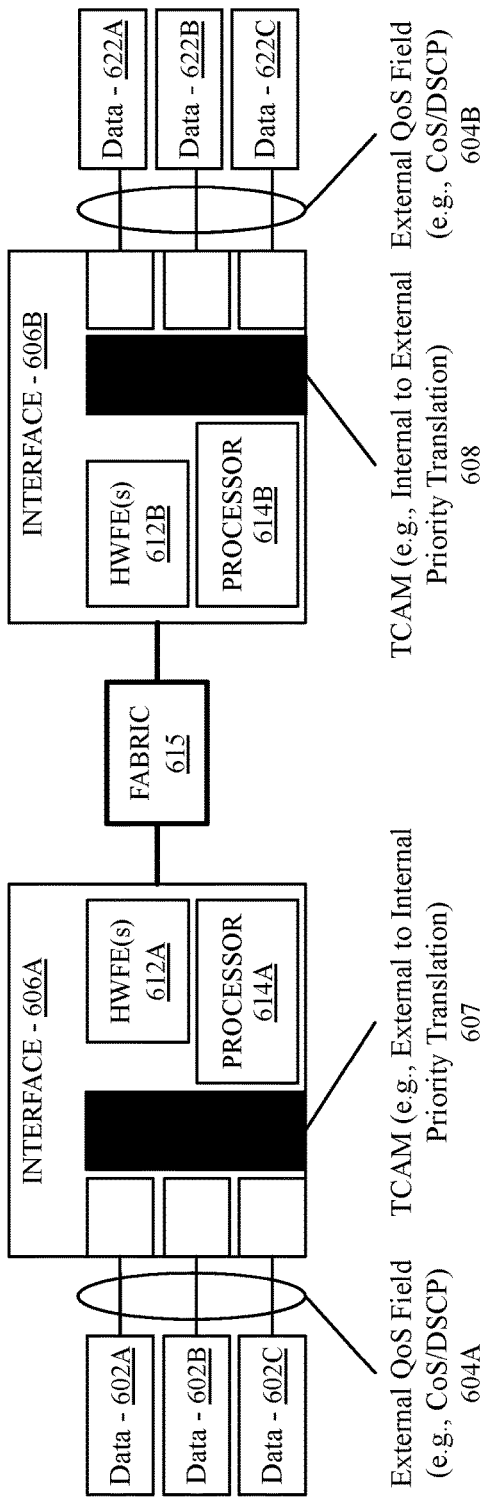
FIGS. 6A-6B illustrate a priority translation system configured to use TCAM variable actions, according to an embodiment.
Figure 6B:
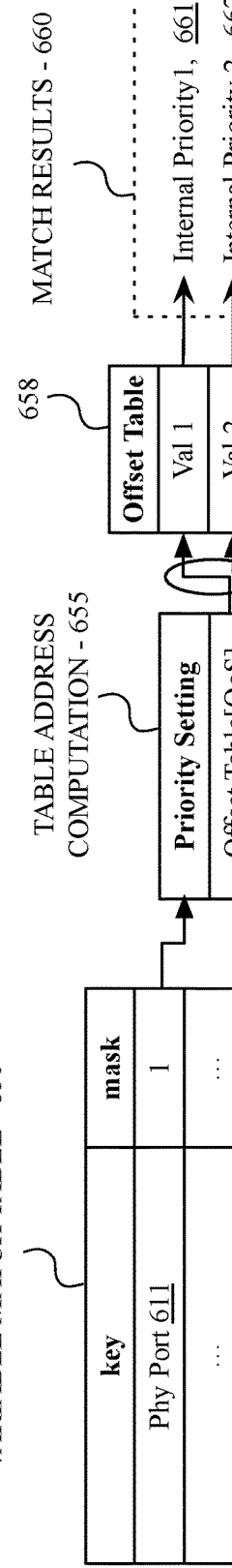

FIGS. 6A-6B illustrate a priority translation system 600 configured to use TCAM variable actions, according to an embodiment. As shown in FIG. 6A, a network element data plane can include a first interface 606A and a second interface 606B, each coupled to a switching fabric 615. Each interface 606A-B, can include one or more hardware forwarding engine(s) 612A-B and a processor 614A-B to configure the HWFE(s) 612A-B. The processor 614A-B can also assist with some forwarding operations and facilitate access to forwarding tables and offset tables stored in network element memory.

In one embodiment the network element can translate data stored in an external QoS field 604A into an internal hardware priority that is used when performing forwarding operations for the network data. The internal priority associated with the network data can then be translated to an associated value to be stored in the QoS field 604B of egress data before transmission. To perform the translation, a first TCAM 607 having support for variable actions can be applied to the network data 602A-C at ingress to one or more of the multiple ports of a first network interface 606A. Among other operations, the first TCAM 607 can be used to perform external to internal priority translation for QoS, such that an incoming unit of data having a specific QoS value can be translated to a matching internal hardware priority. After a forwarding operation is performed, the second interface can apply a second TCAM 608 to perform internal to external priproty translation and determine an external priority value to write into an external QoS field of the egress data 622A-C. The external QoS field can store one of several forms of QoS indicators, such as, but not limited to, a class of service (CoS) indicator for layer 2 data or a differentiated services code point (DSCP) value for layer 3 data.

FIG. 6B shows an exemplary TCAM configuration that can be used to perform the operations of the first TCAM 607. The TCAM includes a variable match table 650 storing a TCAM rule 611 that defines a match key based on a physical port. The mask (1) associated with the TCAM rule 611 signifies that only key bits defining a physical port upon which a unit of network data is received are used to perform a match operation. The action performed following a match against the key of the TCAM rule 611 can be determined in part based on the QoS value read from the external QoS field of the data (e.g., external QoS field 604). Table address computation logic 655 can be used to determine an indirect match 657 in an offset table 658 based on the QoS value read from the ingress data. As illustrated, the indirect match 657 can match to one or more match results 660 including a first internal priority 661 and a second internal priority 662.

The second TCAM 608 of FIG. 6A can operate in a similar manner as indicated by FIG. 6B, excepting that the TCAM rule 611 includes an internal priority variable field that is not used by the matching operation, but is used by the resulting action to determine the proper external QoS priority to write to network data upon egress. Additionally, while an indirect match rule is shown, a direct match operation can also be performed.

Figure 7:
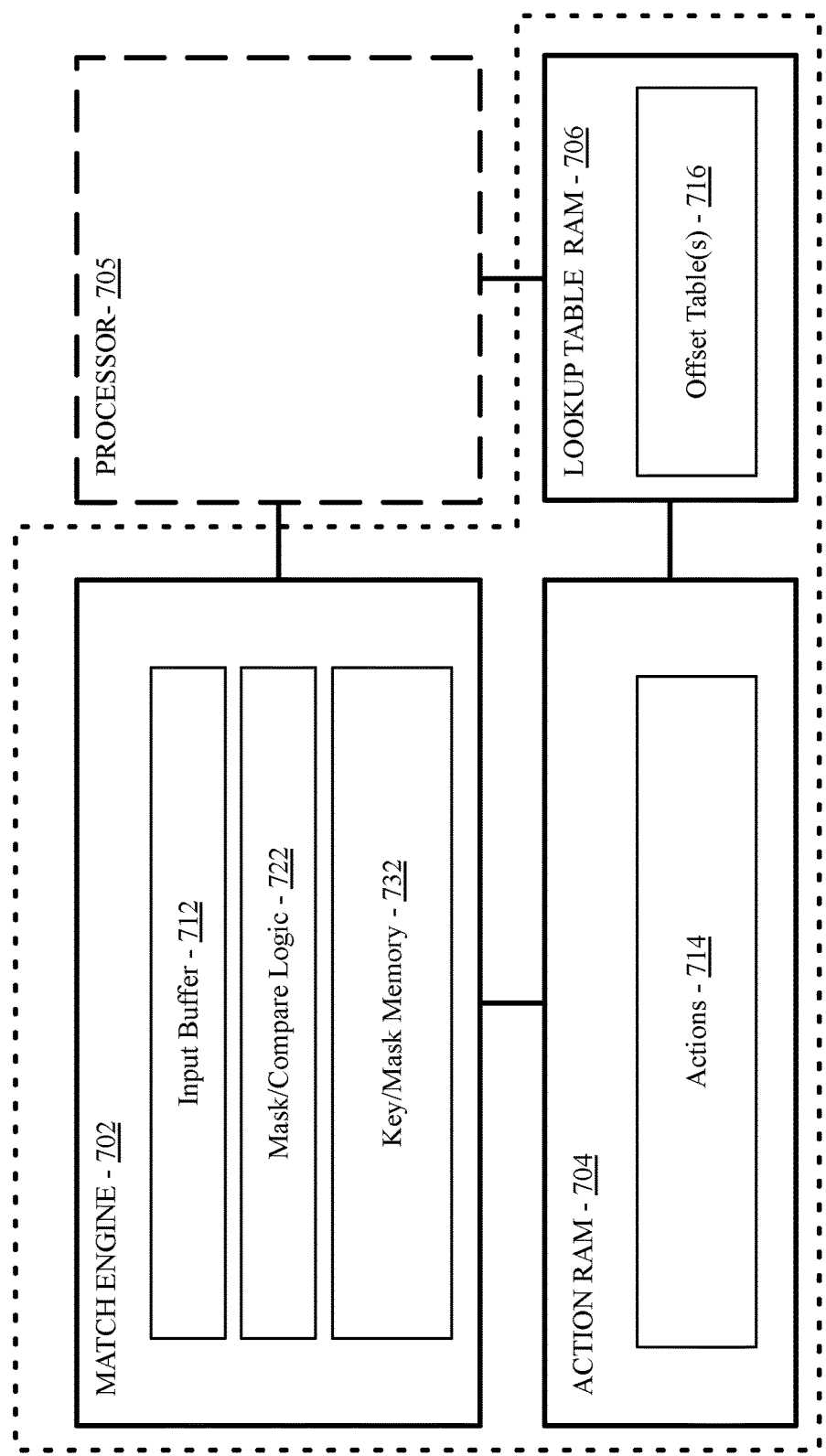
FIG. 7 is an overview of a variable action TCAM module, according to an embodiment.

FIG. 7 is an overview of a variable action TCAM module 700, according to an embodiment. In one embodiment the variable action TCAM module 700 is integrated into a network element, such as the network element 200 of FIG. 2 to implement QoS policies and/or policy based forwarding. In one embodiment the network element includes a forwarding pipeline such as the forwarding pipeline 300 of FIG. 3. In such embodiment the network element can use the variable action TCAM module 700 to perform forwarding and ACL processing of network data.

The match engine 702 has TCAM logic including an input buffer 712 to buffer input data for comparison, mask/compare logic 722 to mask and compare input data using a mask and associated key stored in key/mask memory 732. The match engine 702 couples with action RAM 704 storing actions 714 that can be performed as a result of a match between a key/mask defined for a TCAM rule and input data associated with a network data unit or metadata associated with the network data unit. In one embodiment, a variable rule can be defined that, based on a key match, an action in the set of actions 714 stored in action ram 704 can be selected based on variable input data defined for the rule with the key/mask memory 732.

In one embodiment the variable action TCAM module 700 includes a processor 705. The processor 705 can be data plane processing logic, such as the processors 214A-B of interfaces 206A-B of FIG. 2 or processors 614A-B of interfaces 606A-B of FIG. 6. In one embodiment the processor 705 is a micro-controller, memory controller, or memory access module that is integrated within the match engine 702. The processor 705 can enable the match engine 702 to access one or more offset table(s) 716 stored in lookup table RAM 706 in response to a match to a TCAM variable configured for an indirect match to an action.

In various embodiments the action ram 704 and lookup table RAM 706 can be any type of random access memory. In one embodiment the action ram 704 is static random access memory (SRAM) that is coupled to the match engine 702 via a high performance memory bus. In one embodiment the lookup table RAM 706 is dynamic random access memory (DRAM). In one embodiment, the lookup table RAM 706 also SRAM and may be coupled to the same or a similar high performance memory bus as the action ram 704.

Figure 8:
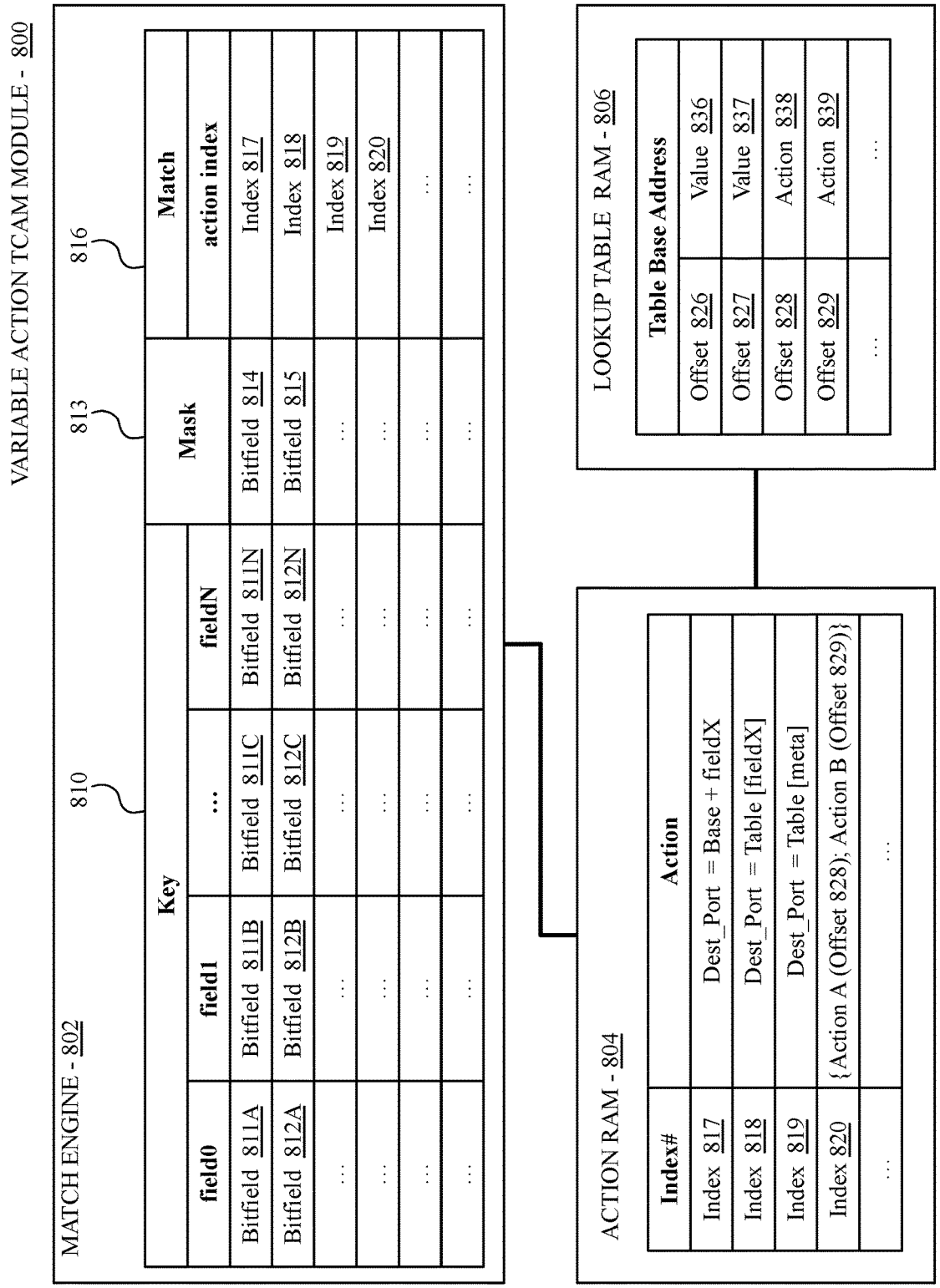
FIG. 8 is a block diagram of a match engine that can implement variable TCAM actions according to embodiments described herein.

FIG. 8 is a block diagram of a match engine 800 that can implement variable TCAM actions according to embodiments described herein. In one embodiment the match engine 800 includes a TCAM 802 that can be configured with multiple rules, where each rule includes a key 810 that includes data values to match against one or more fields (field0-fieldN) that can be associated with various data, such as data in header fields of incoming network data. For example a first rule can include a key having bitfields 811A-N, while a second rule can have a key consisting of bitfields 812A-N. Each rule can have an associated N-bit mask 813 (e.g., bitfield 814, bitfield 815), which is applied to incoming network data before the match operation is performed.

In one embodiment, a match operation 816 can be specified for each rule to be performed upon a match for the rule against input data. The match operation 816 can specify an action index within action RAM 804 coupled with the TCAM. In one embodiment an action can be specified that uses variable data derived from one of the key fields (e.g., fieldX). In one embodiment the action can be determined via a direct match to an index 817, where index 817 specifies an action with a result that is determined based on a base value plus an offset defined by variable data. (e.g., Dest_Port=Base+fieldX). For the action at index 817, the destination port is stored at a location identified by a base value plus an offset, where the offset is derived from one of the fields of the key 810.

In one embodiment the action can include a indirect match in which a base address is specified and the specified variable data (fieldX) is used to retrieve a value from a lookup (e.g., offset) table. For example, the index 818 specifies an action in action RAM 804 that forwards a unit of network data to a destination port, where the destination port is located in lookup table RAM 806. The variable data (fieldX) is used to determine an offset (e.g., offset 826, offset 827, etc.) within the lookup table 806 that contains the value (e.g., value 836, value 837) to use with the action. The processing logic to perform the action 825 for an indirect match can be internal to the match engine 800 or can be external processing logic, such as the processors 614A-B of the interfaces 606A-B of FIG. 6A.

In some embodiments an indirect match action can be configured which will perform some variable action based on variable data that is not explicitly defined within the key 810. For example and in one embodiment, an indirect match into lookup table RAM 806 can be performed to perform a variable action at an index 819, where the variable data is specified as residing in metadata for a unit of network data (e.g., Dest_Port=Table [meta]). The metadata for the unit of data is generated as the unit of network data is processed by the forwarding pipeline of the network element. This metadata may store information about the unit of network data that is relevant internally within the network element, such as the physical input port from which the unit of network data was received or an internal hardware priority associated with the unit of network data. The action can use the value of the specified metadata to determine data as an offset (e.g., offset 826, offset 827, etc.) within the lookup table 806 that contains the value (e.g., value 836, value 837) to use with the action.

Alternatively, instead of internal metadata, an action can be defined which uses a data value within the unit of network data to be forwarded, such as a specific header field within the unit of network data. For example, a portion of a source or destination address for a unit of data can be used as an offset (e.g., offset 826, offset 827, etc.) into the lookup table RAM 806 to derive data to be used with an action.

In one embodiment, a key 810 can match to an action index 820, where the action to be performed is conditioned on variable data, such that a single rule can variably reference one of multiple actions. The actions to be performed can be stored in lookup table RAM 806 instead of action RAM 804. For example, based on any of the mechanism of referencing variable data as described herein (e.g., bitfield data, metadata, network unit data), one of multiple actions can be performed in response to a match. In one of such embodiments, logic can be stored at index 820 in action RAM 804 which will refer to an offset in lookup table RAM 806 (e.g., offset 828, offset 829, etc.) that references an action (e.g., action 838, action 839) to be performed. In one embodiment action index 820 of the match 816 includes logic or data which enables the selection of an action from lookup table RAM 806 without including a reference to action RAM 804.

Network Element having Variable Action TCAM Logic

Figure 9:
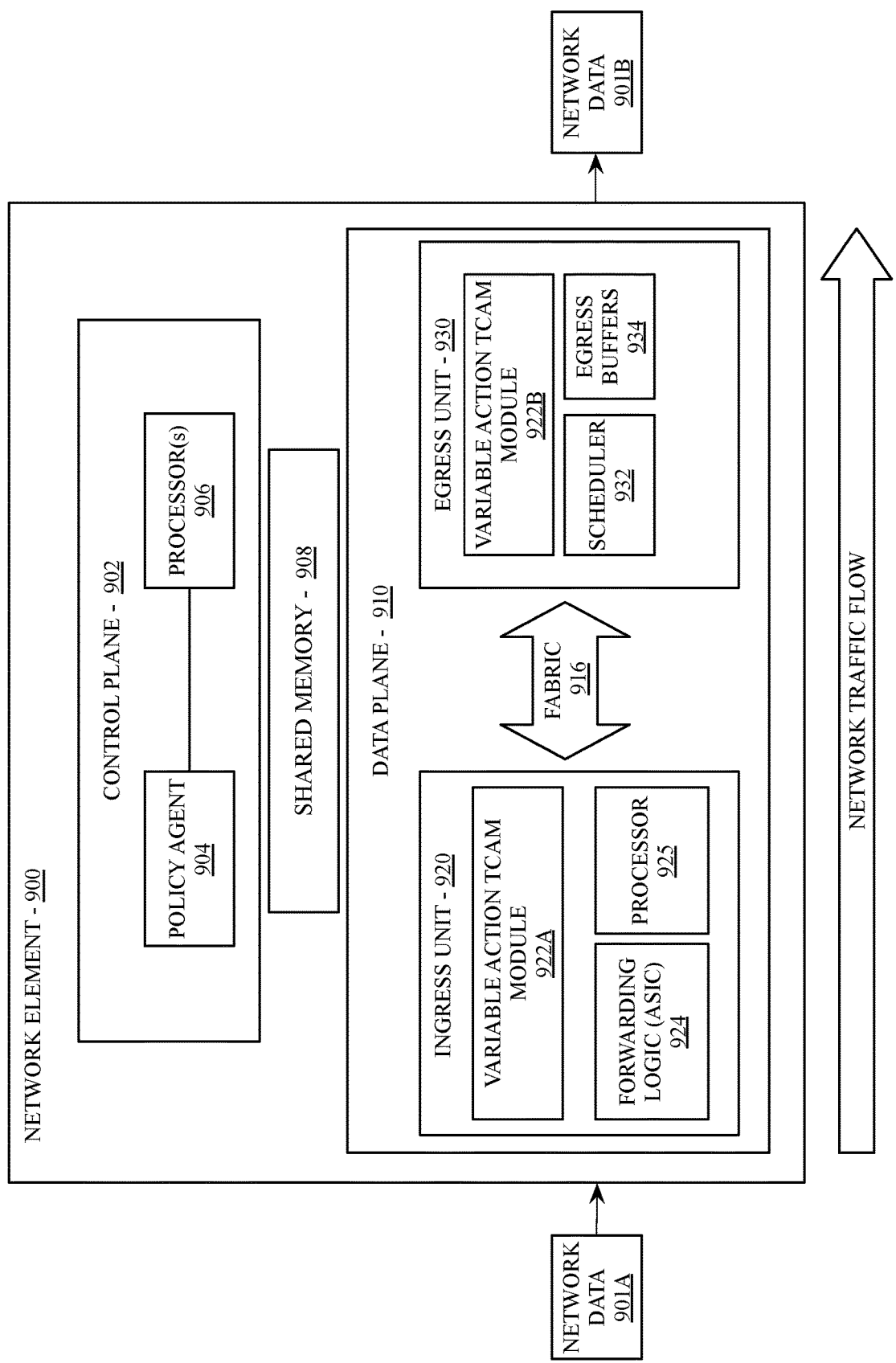
FIG. 9 illustrates a network element having variable action TCAM logic, according to an embodiment.

FIG. 9 illustrates a network element 900 having variable action TCAM logic, according to an embodiment. The network element 900 includes a control plane 902 coupled to a data plane 910 and shared memory 908 that is shared between the control plane 902 and the data plane 910. In one embodiment, the control plane includes one or more processor(s) 906 to perform control plane operations. In one embodiment the processor(s) 906 are dedicated to control plane operations, which can include managing elements of the data plane 910, and are not responsible for performing data forwarding operations. The processor(s) 906 can execute software agents to manage at least a portion of the control plane operations. In one embodiment a policy agent 904 can execute as a software agent of the control plane 902 and executes at least in part on the one or more processor(s) 906. The policy agent can configure policy-based operations for a policy engine, such as the policy engine 211 of FIG. 2, to apply a QoS policy to network traffic flowing through the network element 900.

The data plane 910 includes one or more hardware forwarding engines (e.g., HWFE(s) 206A-C of FIG. 2). Each forwarding engine can include one or more of an ingress unit 920 and an egress unit 930. The ingress unit 920 and the egress unit 930 can include logic to perform equivalent operations as those illustrated and described with respect to the forwarding pipeline 300 of FIG. 3. The ingress unit 920 includes various network interfaces and ports (not shown) to receive and process various data headers on units of incoming network data 901A. The ingress unit 920 can process and forward ingress network data 901A and forward the ingress network data 901A via forwarding logic 924 over a switching fabric 916.

In one embodiment the ingress unit 920 includes a variable action TCAM module 922A. The variable action TCAM module 922A can be used to perform various filtering and traffic shaping operations, including applying ACLs to ingress data as well as perform at least some of the forwarding operations on behalf of the forwarding logic 924. In one embodiment, the policy agent 904 of the control plane 902 can program rules for QoS, filtering, and traffic shaping to the variable action TCAM module 922A.

The shared memory 908 that is accessed by the control plane 902 and the data plane 910 can include information such as forwarding (e.g., switching, routing, etc.) tables that are programmed by the control plane 902 and referenced by the data plane 910. The shared memory 908 can also include one or more offset tables for the variable action TCAM module 922A, and can act as lookup table RAM, such as the lookup table RAM 806 of FIG. 8. In one embodiment the processor 925 of the ingress unit 920 can facilitate access to the shared memory 908 for the variable action TCAM module 922A. In one embodiment the variable action TCAM module 922A includes an internal memory interface to facilitate access to the offset tables in shared memory 908.

In one embodiment the egress unit 930 includes a scheduler 932, which enables the forwarding logic 924 to forward ingress network data 901A to the egress unit 930 by issuing scheduling credits. The scheduler 932 can issue scheduling credits to multiple ingress units 920 within the network element 900 to avoid overflowing the egress buffers 934 used to store egress network data 901B before transmission. In one embodiment, the scheduler 932 resides in the ingress unit 920, and acts as the scheduler 320 of the forwarding pipeline 300 of FIG. 3. Before egress network data 901B is transmitted towards a destination by the egress unit 930, a second variable action TCAM module 922B can be used to apply an egress ACL to the egress network data 901B, for example to determine if the network data is to be transmitted or to be dropped according to a network policy configured, for example, by the policy agent 904.

TCAM Programming and Logic

The specific manner in which rules or actions are programmed can vary among embodiments. In one embodiment, variable input data is specified within a rule key, which matches to an action. In one embodiment the variable input data is omitted from the rule key and programmed directly into the action. Examples of the various programming methods are provided in FIGS. 10A-E Below.

FIG. 10A-E are block diagrams of data elements used in a TCAM key and variable programming system 1000, according to one embodiment.

Figure 10A:
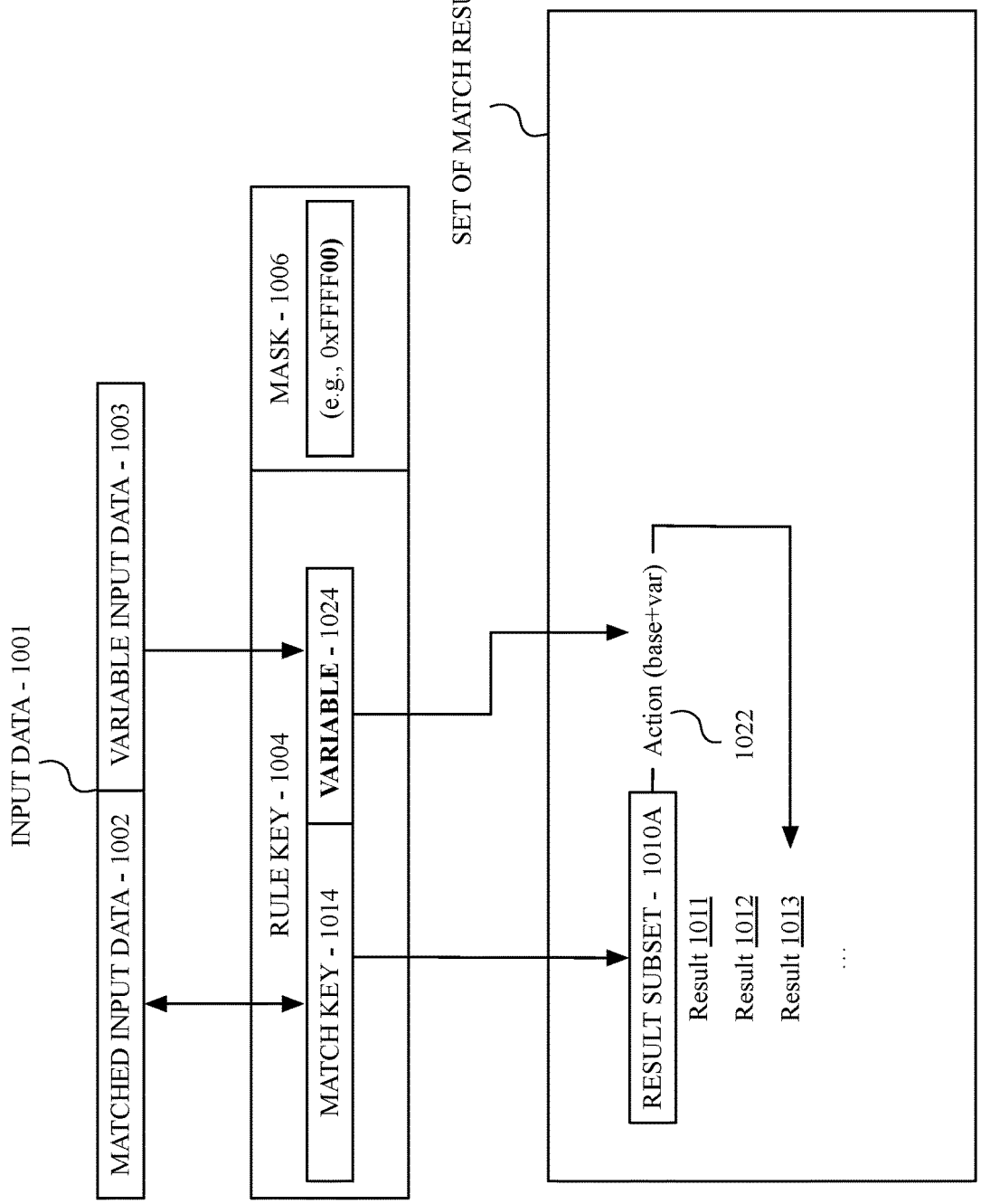
FIG. 10A-E are block diagrams of data elements used in a TCAM key and variable programming system, according to an embodiment.

As shown in FIG. 10A, in one embodiment when a rule is defined using TCAM variables, the rule can include a rule key 1004 and a mask 1006. The rule key 1004 can include a match key 1014 field and a variable 1024 field. The match key 1014 specifies input data that matches the rule, where the matching rule with the highest priority is selected. The highest priority matching rule can match to a set of actions in that define a set of match results 1020.

In one embodiment the variable 1024 field specifies one or more bits of input data that are to be used after a match is found using the match key 1014. The mask 1006 is applied to the input data before the input data is compared with the match key 1014 to select specific bits of the input data for comparison. In one embodiment the mask 1006 includes bits associated with both the match key 1014 and the variable 1024. In one embodiment the bits associated with the variable 1024 are not part of the comparison and the mask 1006 will automatically exclude the bits associated with the variable. In one embodiment rules may be constructed that include at least a portion of the variable data to limit the set of possible results.

In one embodiment, a result subset can be associated with a rule key 1004. When programming a rule, a first result subset 1010A including multiple results (e.g., result 1011, result 1012, result 1013, etc.) can be defined. In one embodiment it is possible for one or more result subsets to overlap.

Upon a match against the match key, 1014, one or more bits of the input data 1001 specified as variable input data 1003 can be used to select a specific result within the selected result subset. In one embodiment the results in a result subset all reference a single action, such as an action to forward an incoming unit of data to a next hop destination. The specific result in the result subset can specify the next hop to which the unit of network data is to be forwarded.

For example, a rule can be specified with a match key 1014 field to search for a specific destination MAC address (DMAC) and a variable 1024 field to indicate that, upon a match to a specific DMAC, an action 1022 is performed in which a variable result is to be selected for use in performing a specified network action, such as performing an action associated with result subset 1010 (e.g., forward to next hop), where the unit of network data associated with the input data 1001 is forwarded to a destination port selected from result 1011, result 1012, or result 1013 based on the variable input data 1003.

Figure 10B:
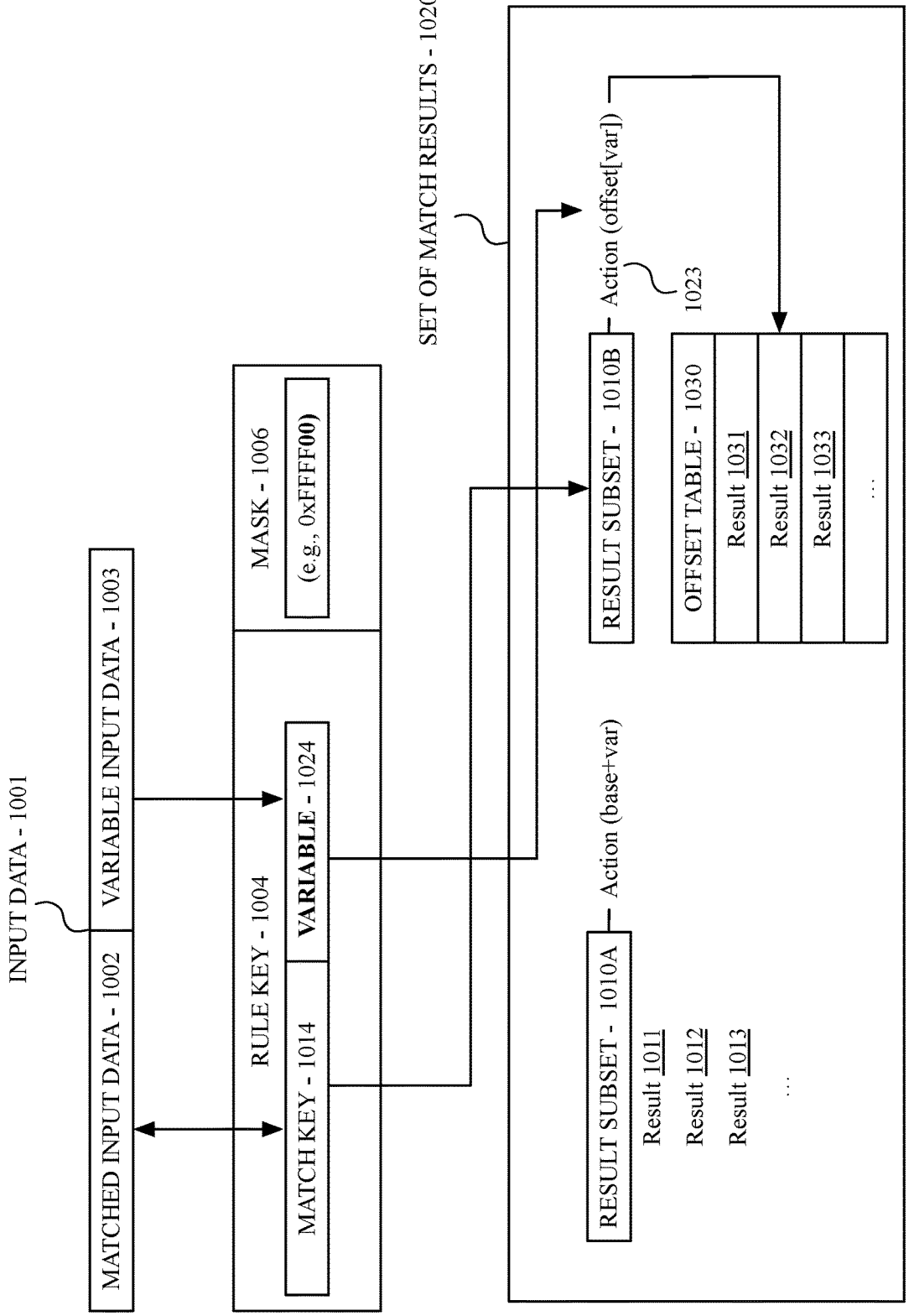

As an additional example shown in FIG. 10B, a rule can be specified with a match key 1014 field to search for a specific destination MAC address (DMAC) and a variable 1024 field to indicate that, upon a match to a specific DMAC. A second result subset 1010B can be defined which references an offset table 1030 including additional results (e.g., result 1031, result 1032, result 1033, etc.). In one embodiment it is possible for one or more result subsets to overlap. A variable result is to be selected for use in performing a specified network action, such as performing an action 1023 associated with the second result subset 1010B (e.g., forward to next hop and apply a L2 domain identifier tag), where the unit of network data associated with the input data 1001 is forwarded to a destination port selected from result 1031, result 1032, or result 1033 in the offset table 1030, based on the variable input data 1003.

Figure 10C:
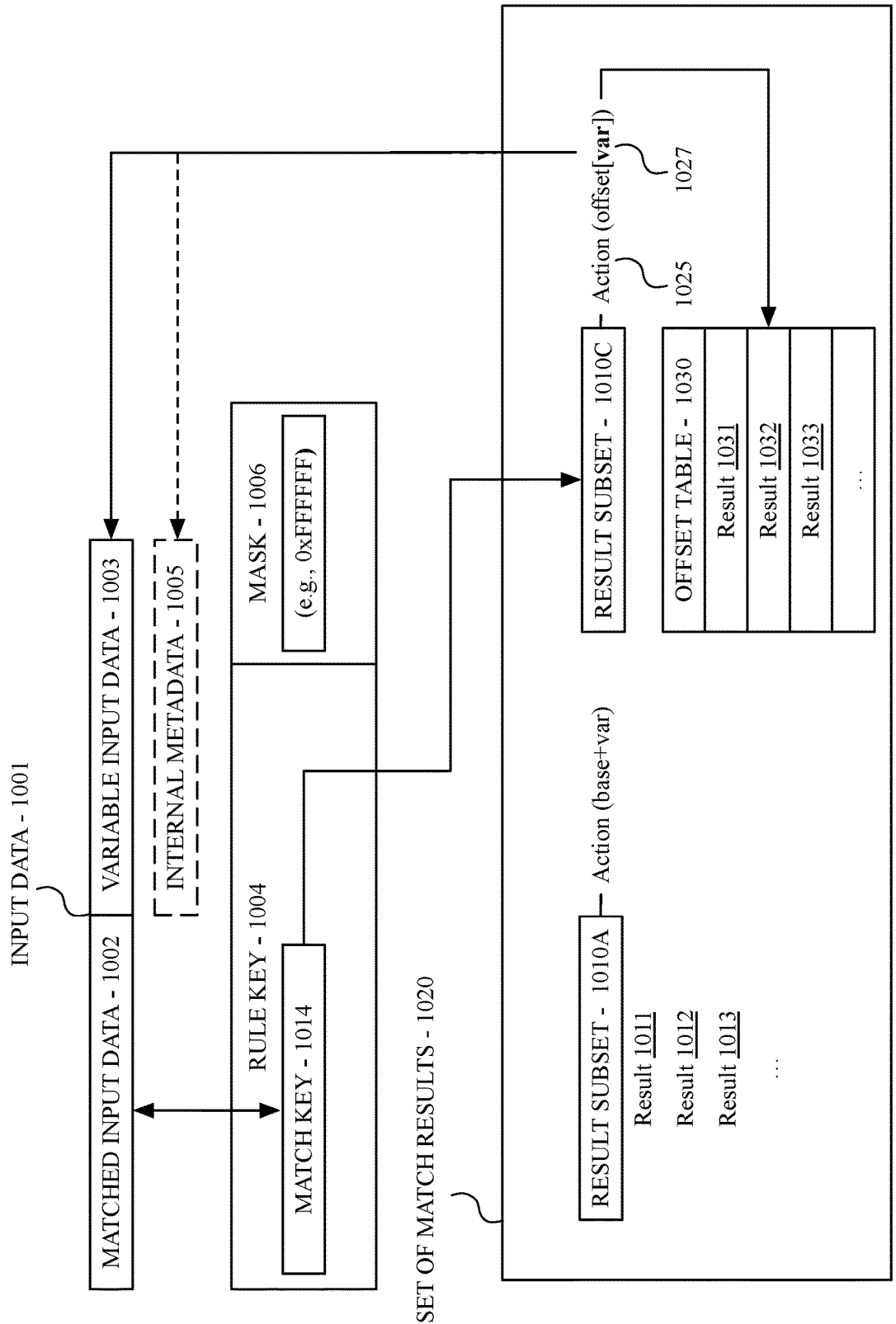

As an additional example shown in FIG. 10C, a rule can be specified for a third result subset 1010C defined by an action 1025 that includes a variable location 1027. Upon a match to a rule referencing such 1025, the logic that processes the action retrieves the variable input data 1003 in a similar manner as if a variable field 1024 were specified within the rule key 1004, as in FIG. 10A and FIG. 10B. In one embodiment, the variable location 1027 can also be configured to derive from internal metadata 1005 associated with the input data 1001. The internal metadata 1005 is internal data that is generated and tracked by a network element while forwarding or processing the input data 1001, and include information such as, but not limited to the input port from which the input data 1001 was received and the internal priority of the input data 1001.

Figure 10D:
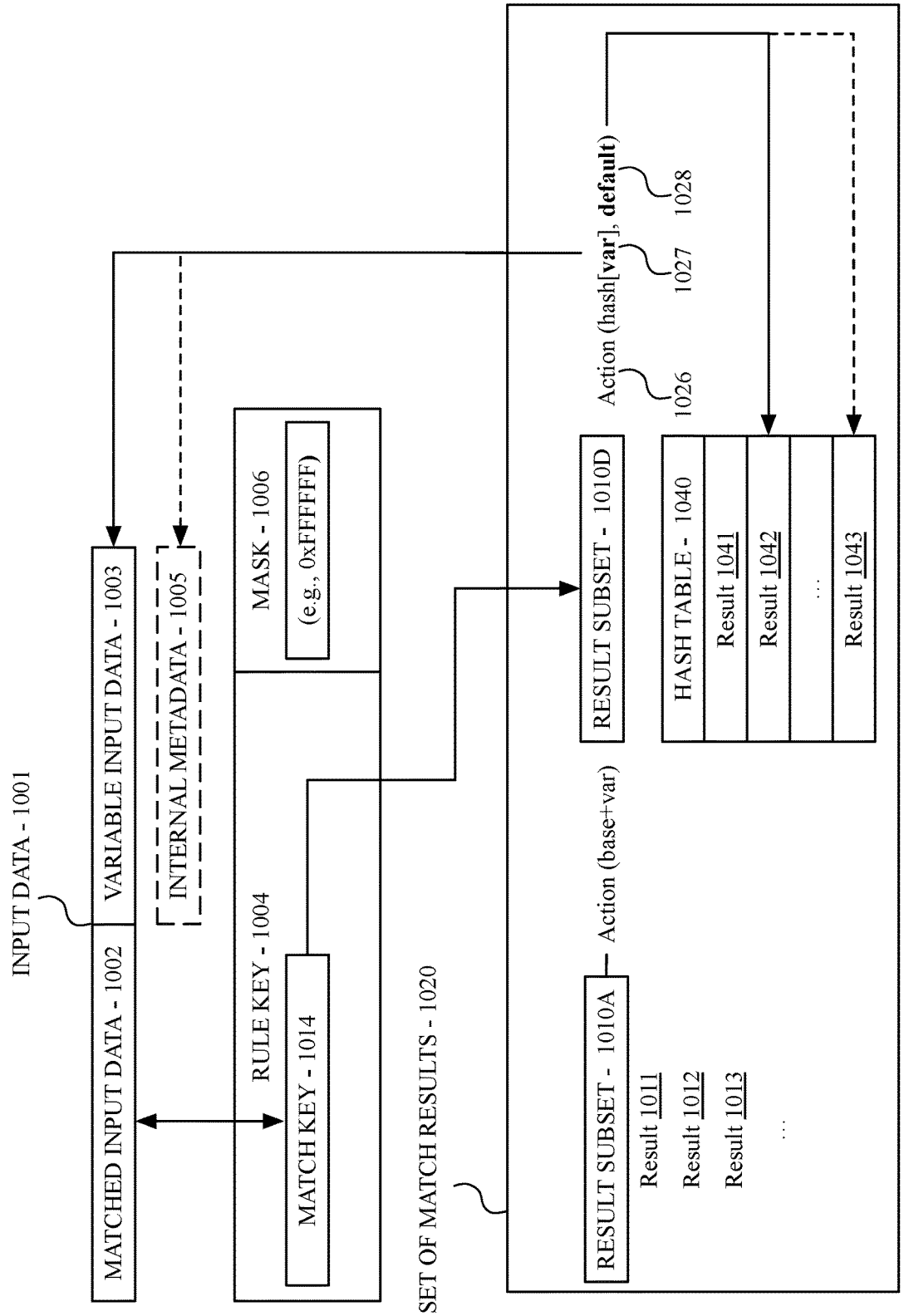

As an additional example shown in FIG. 10D, the offset table 1030 may be replaced by a hash table 1040 including a set of results 1041, 1042, 1043. The hash table 1040 can be used to store results under circumstances in which the value of the variable or the actions defined in the offset table at a large number of offset entries are identical. In such circumstances, the offset table storing a large number of entries can be replaced with a hash table storing a smaller number of distinct entries. Upon a match to an action 1026, associated with a fourth result subset 1010D, a hash function can be applied to the variable input data 1003 selected based on the specified variable location 1027 within action 1026. In one embodiment the hash value can be made unique across all TCAM rules by including an index of the match rule key as part of the hash calculation. The resulting hash value can be used to select a result in the hash table 1040. The hash function can be used to map multiple input values of the variable input data 1003 to a specific one of the results 1041, 1042, 1043.

In one embodiment the action also includes a default value 1028. The default value 1028 can specify any one of the results and the specified result is selected if the hash of the variable input data 1003 and/or the internal metadata 1005 does not match to any of the results.

Figure 10E:
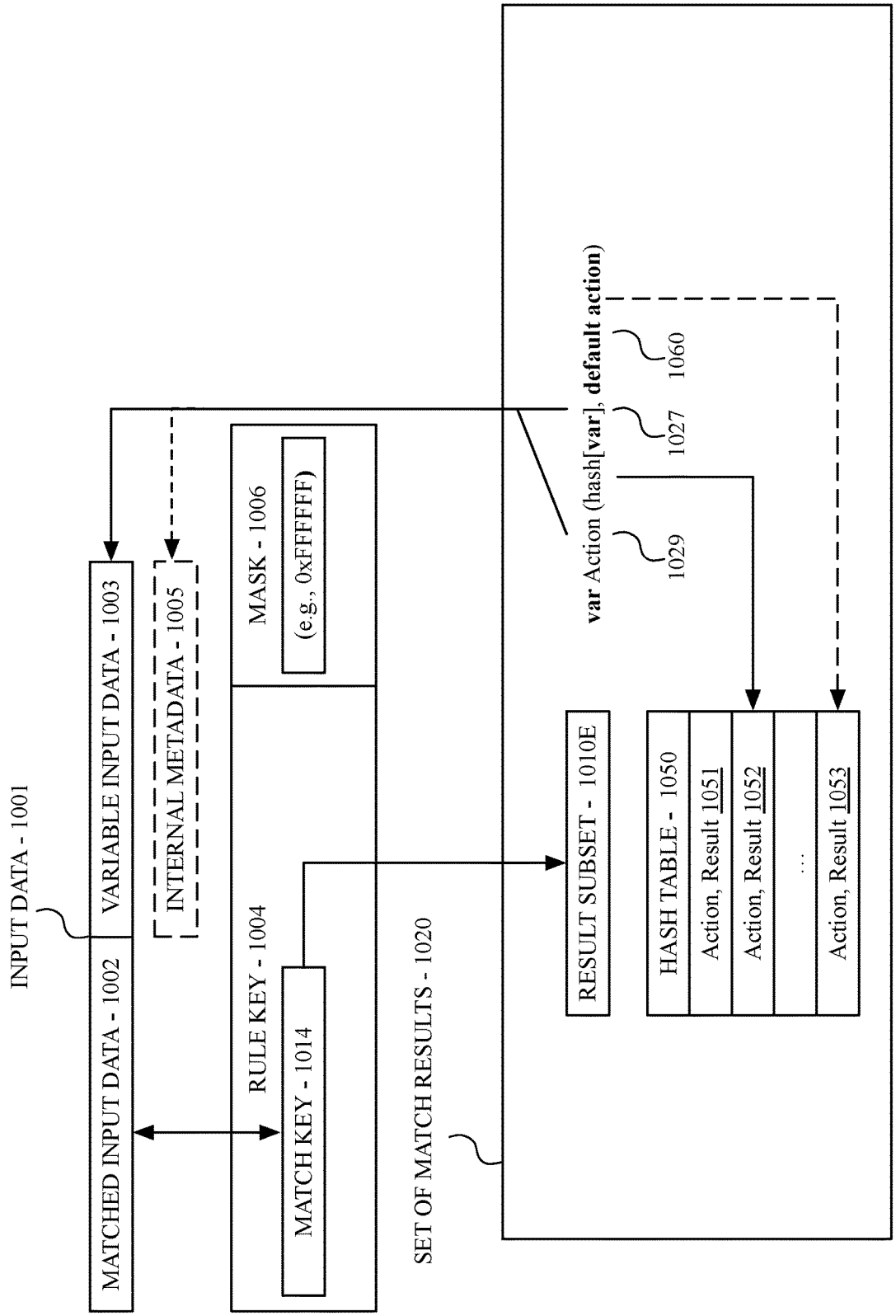

In one embodiment, as shown in FIG. 10E, a fifth result subset 1010E is associated with a variable action 1029 that can be derived based on the hash table 1050 in the case of an indirect match, such as the indirect match illustrated in FIGS. 10B-10D. In such embodiment, the hash table 1050 is used to select the variable action 1029 which, for example, can be selected from a set of action, result tuples (e.g., action, result 1051, action, result 1052, action, result 1053, etc.), based on variable input data 1003 or internal metadata 1005. The variable data 1027 can specify an element of the variable input data 1003 and/or internal metadata 1005 to be used to define an entry in the offset table 1050 and the hash table 1050. A default action 1060 may be specified for use in the event that none of the results in the hash table match the hash of the portion of the variable data 1027 used to perform the lookup in the hash table 1050.

Figure 11:
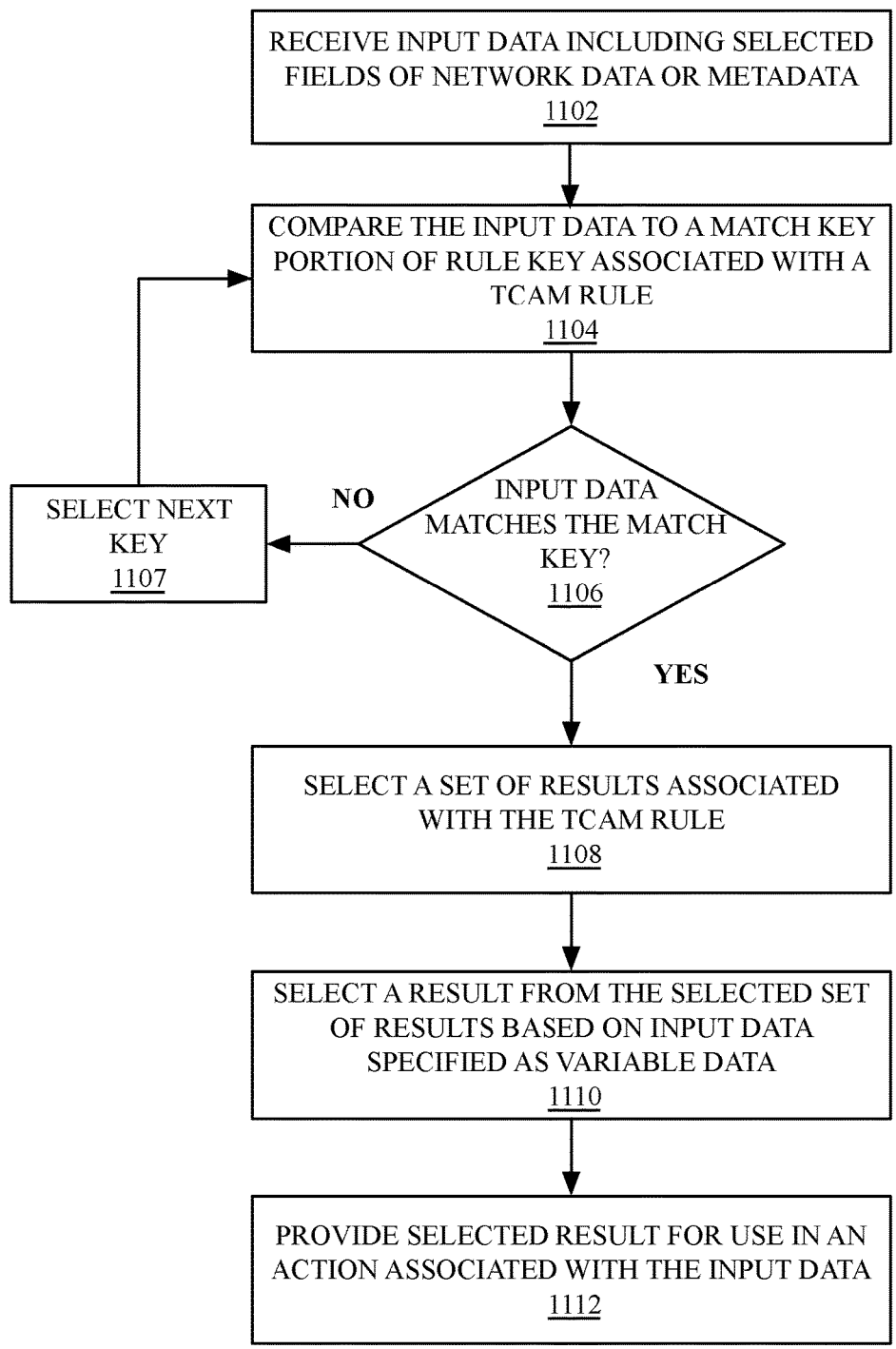
FIG. 11 is a flow diagram of TCAM variable action logic, according to an embodiment.

FIG. 11 is a flow diagram of TCAM variable action logic 1100, according to an embodiment. The TCAM variable action logic 1100 can be performed by any variable action TCAM module as described herein, such as the modules illustrated and described with respect to FIGS. 7-9. The TCAM variable action logic 1100 can be configured using the technique illustrated and described with respect to FIG. 10. TCAM variable action logic 1100 can be used to perform any network element operation in which a TCAM may be used, including, but not limited to the variable forwarding system 500 of FIGS. 5A-B, the priority translation system 600 of FIGS. 6A-B, the ACL operations discussed with respect to the forwarding pipeline 300 of FIG. 3, or any other filtering, forwarding, counting, traffic shaping, or QoS operations that may be performed by a network element using a TCAM.

As shown at block 1102, the TCAM variable action logic 1100 can receive input data including selected fields of network data or metadata, such as source or destination addresses, QoS values, VLAN/VXLAN tags, etc. The input data can be from a unit of network data that is undergoing ingress processing before the unit of network data is forwarded by the network element or can be from a unit of network data that is undergoing egress processing after the unit of network data has been forwarded to a destination port, but before the unit of network data is transmitted onto the destination network. The specific fields of input data can be selected via a mask that is applied to the input data.

At block 1104, the TCAM variable action logic 1100 can compare the selected fields of input data to a match key portion of a rule key associated with a TCAM rule. If at 1106 the TCAM variable action logic 1100 determines that the input data does not match the match key, the logic can select the next key at block 1107 and compare the next selected key of the next selected rule to the input data. While multiple keys may be compared against the input data in parallel, in one embedment a sequential comparison is performed.

At block 1108, the TCAM variable action logic 1100 can select a set of results associated with the TCAM rule. The set of results can include a set of destination ports with which input data may be forwarded, a set of VLAN or VXLAN tags that can be applied to network data on egress, a QoS priority or internal hardware priority that can be applied to the input data, or any other data relevant to performing an action on a network element using a TCAM. Each set of results can be associated with a base action in random access memory associated with the TCAM (e.g., TCAM action memory) or an offset table base address (e.g., in shared memory or data plane accessible memory).

At block 1110, the TCAM variable action logic 1100 can select a result from the selected set of results based on the input data specified as variable data. Selecting the result can include selecting a result at memory address determined by adding an offset associated with the input data specified as variable data to a base address associated with a set of results associated with a TCAM rule. The specific offset associated with the result can be determined by adding the data value of the bits specified as variable data to the base address of the set of results, via a lookup table, via an arithmetic calculation, or any other method of deriving a memory offset for the result based on the input data value of the bits specified as variable input data.

At block 1112, the TCAM variable action logic can provide the selected result (e.g., to other network element logic) for use in an action associated with the input data. Embodiments described herein are not limited to any particular or specific action to be performed by the network element in response to a rule match.

Exemplary Data Processing System and Modular Network Element

Figure 12:
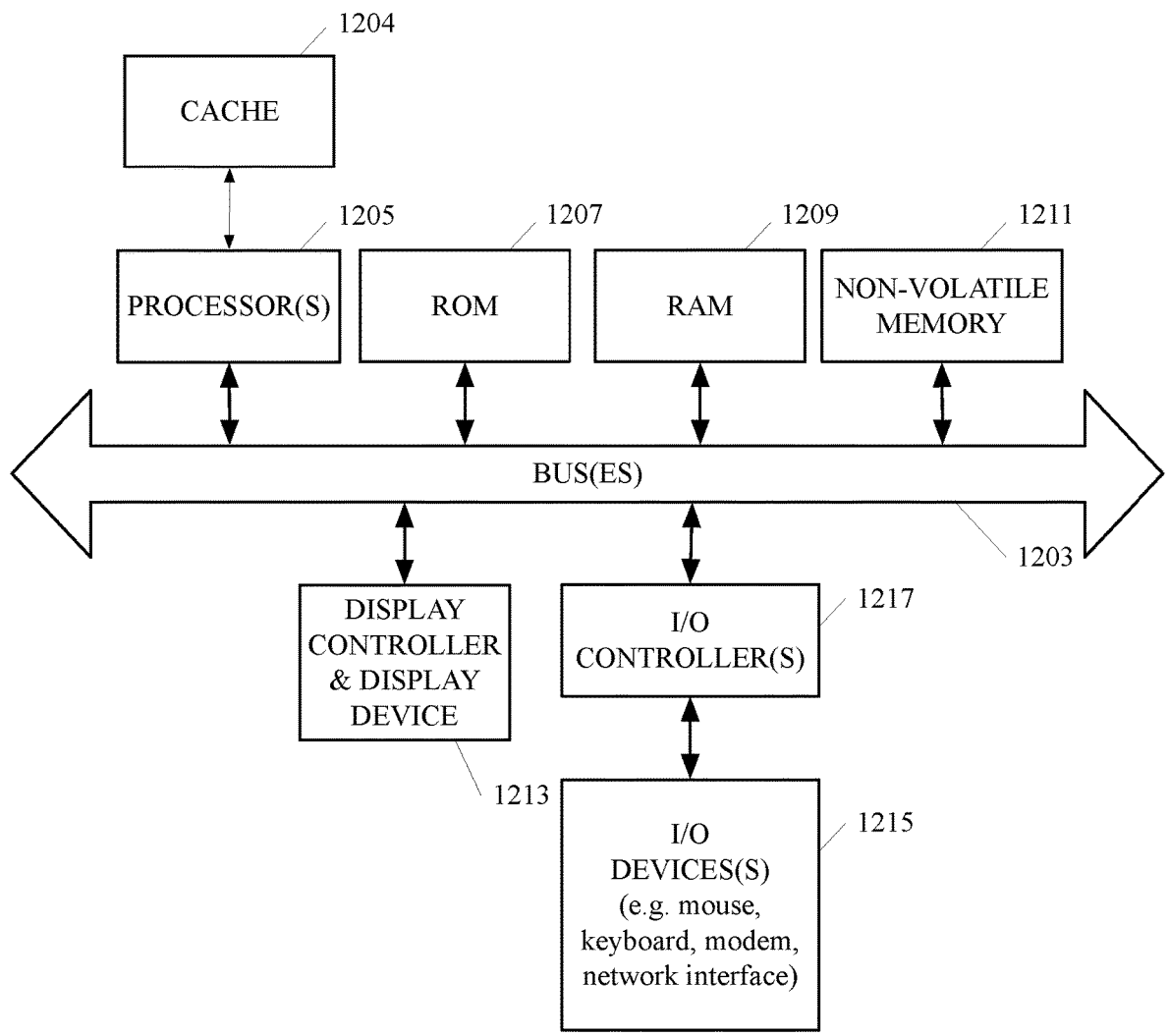
FIG. 12 shows one example of a data processing system, which may be used with embodiments described herein.

FIG. 12 shows one example of a data processing system 1200, which may be used with one embodiment of the present invention. For example, the data processing system 1200 may be implemented including one or more of network element 100 as in FIG. 1. In one embodiment, the data processing system 1200 is used within the control plane of a network element described herein. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1200 includes one or more bus(es) 1203 which couple to one or more microprocessor(s) 1205, ROM 1207 (Read Only Memory), RAM 1209 (random access memory), which may be volatile memory, and a non-volatile memory 1211. In one embodiment, the one or more microprocessor(s) 1205 couple to a cache 1204, which can include one or more sets of instruction and/or data caches. The bus(es) 1203 may include one or more buses connected to each other through various bridges, controllers and/or adapters as is well known in the art.

The microprocessor(s) 1205 may retrieve the instructions from the ROM 1207, RAM 1209, and/or non-volatile memory 1211 and execute the instructions to perform operations described above. Instructions and/or associated data retrieved from the memories may be stored in the cache 1204. The bus(es) 1203 interconnect system components with each other, and to a display controller and display device 1213, and to peripheral devices such as input/output (I/O) devices, which may be mice, keyboards, modems, network interfaces, printers and other devices well known in the art. Typically, the input/output devices 1215 are coupled to the system via input/output controller(s) 1217. The volatile RAM (Random Access Memory) 1209 is typically implemented as dynamic RAM (DRAM), which requires power continually in order to refresh or maintain the data in the memory, but may also include static ram (SRAM), which does not require a periodic refresh.

In one embodiment, the non-volatile memory 1211 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1211 will also be a random access memory although this is not required. While FIG. 12 shows that the non-volatile memory 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 13:
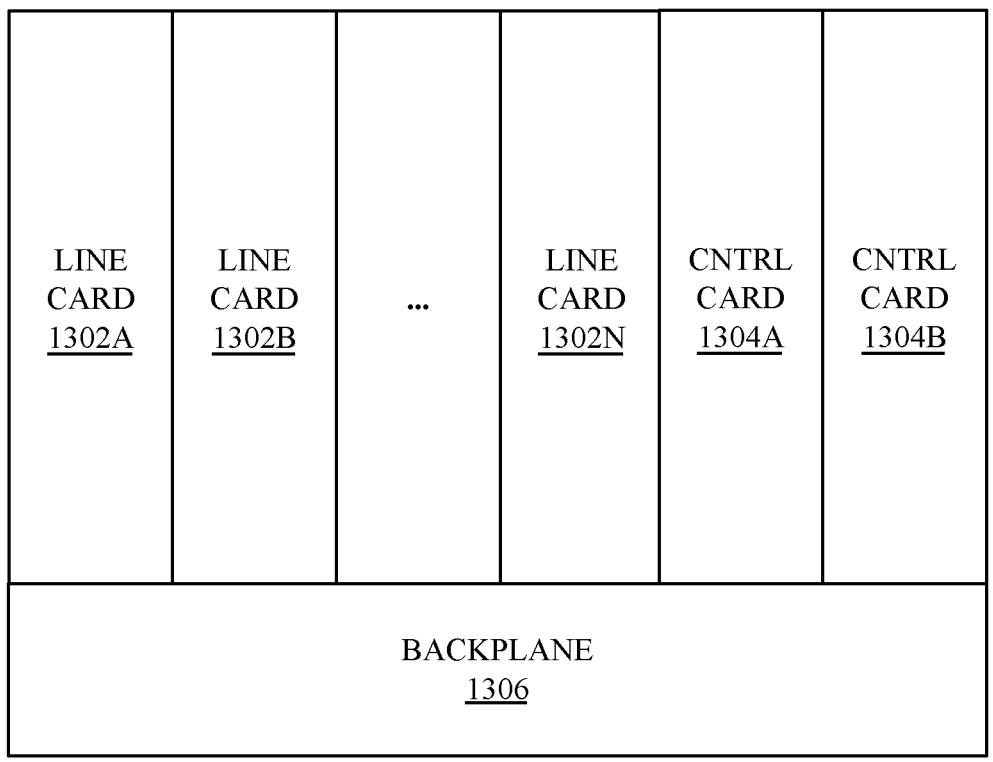
FIG. 13 is a block diagram of an additional embodiment of an exemplary network element as described herein.

FIG. 13 is a block diagram of an additional embodiment of an exemplary modular network element 1300 as described herein. In one embodiment, the network element has a modular and expandable configuration that allows the addition or removal of resources configured as line cards 1302A-N, or controller cards 1304A-B coupled to a backplane 1306. In one embodiment, the controller cards 1304A-B control the processing of the traffic by the line cards 1302A-N, which can each include one or more network data forwarding devices such as interfaces 106A-C as in FIG. 1, although the precise nature of the forwarding devices is not limited as such. In one embodiment, the line cards 1302A-N process and forward traffic according to the network policies received from controller cards the 1304A-B. In one embodiment, one or more of the line cards 1302A-N can monitor and report internal performance data, such as latency data for all or selected units of network data traversing the network element. In one embodiment, the controller cards 1304A-B can also be configured to perform all or a sub-set of functions provided by the line cards 1302A-N. It should be understood that the architecture of the network element 1300 illustrated in FIG. 13 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Embodiment described herein provide for a network element including a TCAM supporting variable actions. The variable actions enable multiple TCAM rules to be condensed into a single rule that selects a result and/or action based on a variable portion of input data.

One embodiment provides for a network element comprising a network port to receive a unit of network data and a data plane coupled to the network port. In such embodiment the data plane including a ternary content addressable memory (TCAM) module to compare a first set of bits in the unit of network data with a second set of bits in a key associated with a TCAM rule. The second set of bits includes a first subset of bits and a second subset of bits and the TCAM module includes first logic to compare the first subset of bits against one or more bits in the first set of bits and second logic to select a result using the second subset of bits after the first logic determines a match to the first subset of bits.

One embodiment provides for a network processing system comprising a forwarding module to forward a unit of network data; and a ternary content addressable memory (TCAM) module coupled to the forwarding module, the TCAM module to select a set of forwarding actions for the forwarding module based a match between a first set of bits in the unit of network data and a second set of bits in a TCAM match key and to select a forwarding action from the set of forwarding actions based on a third set of bits, the third set of bits to be identified by a fourth set of bits.

One embodiment provides for a data processing method in an integrated circuit, the method comprising receiving input data including selected fields of network data or metadata and comparing the input data to a match key portion of a rule key associated with a rule within the integrated circuit, the integrated circuit including a ternary content addressable memory (TCAM). In such embodiment the rule key includes the match key portion and a variable portion, the variable portion to specify one or more bits of the input data that contain variable data. In a further embodiment the method additionally comprises selecting a set of results within memory associated with the TCAM in response to a ternary comparison match between at least the match key portion and the input data; selecting a result from the set of results using the one or more bits of the input data specified as containing variable data; and providing the result selected from the set of results to logic within a network element.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network element comprising:
a network port to receive a unit of network data;
a data plane coupled to the network port, the data plane including a ternary content addressable memory (TCAM) module to compare a first set of bits in the unit of network data with a second set of bits in a TCAM key associated with a TCAM rule, wherein:
the second set of bits includes a mask that delineates a first subset of bits and a second subset of bits of the TCAM key;
the TCAM module includes first TCAM logic to compare, based upon the mask, the first subset of bits against one or more bits in the first set of bits and second logic to further select a second result among a plurality of results using the second subset of bits after the first TCAM logic determines a first result from a TCAM entry match to the first subset of bits; and
a forwarding module to forward the unit of network data based on the first and second result.

2. The network element as in claim 1, wherein the second subset of bits identifies one or more bits within the first set of bits in the unit of network data to use as variable data to determine a variable result.

3. The network element as in claim 2, wherein the variable result is associated with an action to be performed by the network element based on the variable data.

4. The network element as in claim 3, wherein the TCAM rule is a Quality of Service (QoS) rule and the action includes to apply a priority value to the unit of network data based on the variable data.

5. The network element as in claim 3, wherein the action includes to apply a tag associated with a layer 2 domain identifier to the unit of network data.

6. The network element as in claim 5, wherein action includes to apply a tag associated with a virtual local area network (VLAN) identifier.

7. The network element as in claim 5, wherein action includes to apply a tag associated with a virtual extensible local area network (VXLAN) identifier.

8. The network element as in claim 1, wherein the second subset of bits identifies one or more bits within the first set of bits in the unit of network data to use as variable data to determine a variable result, the variable result is associated with an action to be performed by the network element based on the variable data, the TCAM rule is a forwarding rule and the action includes to forward the unit of network data to a destination determined by the variable data.

9. The network element as in claim 8, wherein the forwarding rule is a layer-2 forwarding rule and the first subset of bits includes at least a portion of a layer-2 network address.

10. The network element as in claim 8, wherein the forwarding rule is a layer-3 forwarding rule and the first subset of bits includes at least a portion of a layer-3 network address.

11. The network element as in claim 1, wherein the data plane additionally includes a first memory coupled to the TCAM module, the first memory to store a first portion of a set of results.

12. The network element as in claim 11, wherein a first result in the set of results is selected based on a combination of a value defined by the second subset of bits and a base value associated with the set of results.

13. The network element as in claim 12, wherein the data plane additionally includes a processing unit coupled to the TCAM module and a second memory, the second memory to store a second portion of the set of results.

14. The network element as in claim 13, wherein a second result in the set of results is selected from an address in the second memory, the address is defined by a base address and an offset, and the offset is defined by the second subset of bits.

15. The network element as in claim 13, wherein a second result in the set of results is selected from an address in the second memory, the address is defined by a base address and an offset, and the offset is defined by a hash of the second subset of bits.

16. A network processing system comprising:
a ternary content addressable memory (TCAM) module coupled to the forwarding module, the TCAM module to select a set of forwarding actions for the forwarding module based on a match between a first set of bits in a unit of network data and a second set of bits in a TCAM match key and to further select, after the match, a forwarding action from the set of forwarding actions based on a third set of bits, the third set of bits to be identified by a fourth set of bits, the fourth set of bits to be specified by a mask in the TCAM match key and to not be matched against the first set of bits to select the forwarding action; and
a forwarding module, coupled to the TCAM module, the forwarding module to forward the unit of network data based on the forwarding action.

17. The network processing system as in claim 16, wherein the third set of bits is in the unit of network data or metadata associated with the unit of network data.

18. The network processing system as in claim 17, the fourth set of bits to be specified by an action within the set of forwarding actions.

19. A data processing method in an integrated circuit, the method comprising:
receiving input data including selected fields of network data or metadata;
comparing the input data to a match key portion of a rule key associated with a rule within the integrated circuit, the integrated circuit including a ternary content addressable memory (TCAM), wherein the rule key is a TCAM rule key that includes the match key portion and a mask portion, the mask portion to specify one or more bits of the input data that contain variable data;
selecting a first result from set of results within a second memory associated with the TCAM in response to a ternary comparison match between at least the match key portion and the input data, wherein the second memory is separate from the TCAM;
after selecting the first result, further selecting a second result from the set of results using the one or more bits of the input data specified as containing variable data; and
providing the second result selected from the set of results to logic within a network element; and forwarding a unit of network data based on the set of results.

20. The data processing method as in claim 19, additionally comprising selecting the result from the set of results from a memory address having a base address associated with the rule key and an offset associated with the variable data.

21. The data processing method as in claim 19, additionally comprising selecting the result from the set of results from a memory address having a base address associated with the rule key and an offset associated with a hash of the variable data.

22. The data processing method as in claim 19, additionally comprising:
selecting an action from the set of results from a memory address having a base address associated with the rule key and an offset associated with the variable data; and
selecting the result from the set of results from a memory address having a base address associated with the rule key and an offset associated with a hash of the variable data.

23. A network element comprising:
a network port to receive a unit of network data;
a data plane coupled to the network port, the data plane including a ternary content addressable memory (TCAM) module to compare a first set of bits in the unit of network data with a second set of bits in a TCAM key associated with a TCAM rule, wherein the second set of bits includes a mask that delineates a first subset of bits and a second subset of bits of the second set of bits and the TCAM module includes first logic to compare, based upon the mask, one or more bits in the first set of bits against the second set of bits, and second logic to further select a second action or a second result using bits from either the second subset of bits, from the unit of network data, or from metadata associated with the unit of network data, after the first logic determines a first result based on comparing the first set of bits against the second set of bits; and
a forwarding module to forward the unit of network data based on the second action or the second result.

24. A network element as in claim 23, wherein the metadata associated with the unit of network data includes an incoming port for the unit of network data or an internal priority associated with the unit of network data.

* * * * *